United States Patent
Wu et al.

(10) Patent No.: US 9,503,223 B2
(45) Date of Patent: Nov. 22, 2016

(54) CONTROLLING NETWORK DEVICE BEHAVIOR

(75) Inventors: Wei Wu, Santa Clara, CA (US); Khiem Le, Coppell, TX (US); Noun Choi, Flower Mound, TX (US)

(73) Assignee: BlackBerry Limited, Waterloo, ON (CA)

( * ) Notice: Subject to any disclaimer, the term of this patent is extended or adjusted under 35 U.S.C. 154(b) by 504 days.

(21) Appl. No.: 13/041,019

(22) Filed: Mar. 4, 2011

(65) Prior Publication Data

US 2012/0226802 A1    Sep. 6, 2012

(51) Int. Cl.
*G06F 15/173*    (2006.01)
*H04L 1/18*    (2006.01)
(Continued)

(52) U.S. Cl.
CPC .......... *H04L 1/1825* (2013.01); *H04L 1/1883* (2013.01); *H04L 1/1887* (2013.01); *H04L 43/10* (2013.01); *H04L 47/27* (2013.01); *H04L 69/14* (2013.01); *H04L 47/193* (2013.01); *H04L 47/283* (2013.01); *H04L 47/34* (2013.01); *H04L 69/16* (2013.01); *Y02B 60/33* (2013.01)

(58) Field of Classification Search
CPC .................. H04L 47/27; H04L 47/283; H04L 47/34; H04L 69/14; H04L 69/16; H04L 1/1887; H04L 29/06; H04L 63/029; H04L 69/329; H04L 1/0002; H04L 43/0811; H04L 67/02; H04L 12/1877; H04L 29/12509; H04L 1/1825; H04L 1/1883; H04L 43/10; H04L 47/193; H04W 36/02; H04W 36/14; H04N 21/234327; H04N 21/631

USPC ....... 370/229, 230, 231, 235, 252, 394, 216, 370/401, 221, 225; 709/202, 203, 208, 209, 709/210, 214, 218, 228, 227, 229, 230, 231, 709/232, 235, 237, 238, 240, 244, 250, 224
See application file for complete search history.

(56) References Cited

U.S. PATENT DOCUMENTS 5,313,454 A    5/1994  Bustini et al.
6,389,016 B1 *  5/2002  Sabaa et al. ................... 370/389
(Continued)

FOREIGN PATENT DOCUMENTS

CN    101296161 A  * 10/2008
CN    101741517      6/2010
(Continued)

OTHER PUBLICATIONS

Patent Cooperation Treaty, "International Search Report," issued by the International Searching Authority in connection with PCT application No. PCT/CA2011/000645, mailed Nov. 15, 2011 (6 pages).
(Continued)

*Primary Examiner* — Brian J Gillis
*Assistant Examiner* — Shean Tokuta
(74) *Attorney, Agent, or Firm* — Fish & Richardson P.C.

(57) ABSTRACT

A sender device is able to send packets over a network destined to a receiver device, and the sender device receives response information that is responsive to the packets. A behavior of the sender device with respect to data transmission on plural subflows of a connection is controlled based on the response information.

18 Claims, 14 Drawing Sheets

(51) Int. Cl.
*H04L 12/26* (2006.01)
*H04L 12/807* (2013.01)
*H04L 12/801* (2013.01)
*H04L 12/841* (2013.01)
*H04L 29/06* (2006.01)

(56) References Cited

U.S. PATENT DOCUMENTS

| | | | | |
|---|---|---|---|---|
| 6,424,625 | B1* | 7/2002 | Larsson et al. | 370/236 |
| 6,498,865 | B1* | 12/2002 | Brailean et al. | 382/239 |
| 6,611,535 | B2* | 8/2003 | Ljungqvist | 370/477 |
| 6,631,120 | B1* | 10/2003 | Milbrandt | 370/252 |
| 7,359,919 | B2 | 4/2008 | Cohen et al. | |
| 7,768,962 | B2* | 8/2010 | Kubota et al. | 370/328 |
| 8,270,369 | B1* | 9/2012 | Chang | 370/331 |
| 2002/0078198 | A1* | 6/2002 | Buchbinder et al. | 709/224 |
| 2002/0087888 | A1* | 7/2002 | Yamakawa et al. | 713/201 |
| 2002/0114332 | A1 | 8/2002 | Apostolopoulos et al. | |
| 2003/0112765 | A1* | 6/2003 | Gaspard et al. | 370/252 |
| 2003/0128705 | A1* | 7/2003 | Yi | H04L 1/1841 370/394 |
| 2004/0048629 | A1* | 3/2004 | Yoon | 455/466 |
| 2004/0057530 | A1 | 3/2004 | Tarokh et al. | |
| 2004/0139213 | A1* | 7/2004 | Bhagwat et al. | 709/230 |
| 2004/0184442 | A1* | 9/2004 | Jones et al. | 370/351 |
| 2004/0196860 | A1 | 10/2004 | Gao et al. | |
| 2005/0180415 | A1* | 8/2005 | Cheung | H04L 1/0006 370/389 |
| 2006/0067256 | A1* | 3/2006 | Alazraki et al. | 370/300 |
| 2006/0187820 | A1* | 8/2006 | Zhu et al. | 370/320 |
| 2007/0198900 | A1* | 8/2007 | Ryu et al. | 714/776 |
| 2007/0214262 | A1* | 9/2007 | Buchbinder et al. | 709/224 |
| 2008/0036589 | A1* | 2/2008 | Werb et al. | 340/539.22 |
| 2008/0279183 | A1 | 11/2008 | Wiley et al. | |
| 2008/0288580 | A1* | 11/2008 | Wang et al. | 709/203 |
| 2009/0207772 | A1 | 8/2009 | Ehara et al. | |
| 2010/0031109 | A1* | 2/2010 | Muramoto et al. | 714/748 |
| 2010/0039937 | A1 | 2/2010 | Ramanujan et al. | |
| 2010/0125768 | A1 | 5/2010 | Mauchly et al. | |
| 2010/0156930 | A1* | 6/2010 | Ghyme et al. | 345/619 |
| 2010/0192034 | A1* | 7/2010 | Chhaya et al. | 714/748 |
| 2010/0296388 | A1* | 11/2010 | Shimizu et al. | 370/216 |
| 2010/0329248 | A1* | 12/2010 | Eggert et al. | 370/389 |
| 2011/0026414 | A1* | 2/2011 | Banerjee | 370/252 |
| 2011/0149739 | A1* | 6/2011 | Sarkar | 370/235 |
| 2011/0299386 | A1 | 12/2011 | Negoto et al. | |
| 2012/0057456 | A1* | 3/2012 | Bogatin | H04W 28/08 370/230.1 |
| 2012/0281564 | A1* | 11/2012 | Zhang | H04L 1/08 370/252 |

FOREIGN PATENT DOCUMENTS

| | | | |
|---|---|---|---|
| GB | 2467424 | | 8/2010 |
| GB | 2467424 A | * | 8/2010 |
| KR | 2005059799 A | * | 6/2005 |

OTHER PUBLICATIONS

Patent Cooperation Treaty, "Written Opinion of the International Searching Authority," issued by the International Searching Authority in connection with PCT/CA2011/000645, mailed Nov. 15, 2011 (7 pages).

Ford et al., Internet Engineering Task Force, Architectural Guidelines for Multipath TCP Development Draft-ietf-mptcp-architecture-05, Jan. 21, 2011 (30 pages).

Information Sciences Institute, Internet Protocol—DARPA Internet Program Protocol Specification, RFC 791, dated Sep. 1981 (49 pages).

Information Sciences Institute, Transmission Control Protocol, RFC 793, dated Sep. 1981 (91 pages).

Deering et al., Network Working Group, Internet Protocol, Version 6 (IPv6) Specification, RFC 2460, dated Dec. 1998 (40 pages).

Carpenter et al., Network Working Group, Middleboxes: Taxonomy and Issues, RFC 3234, Feb. 2002 (28 pages).

Floyd et al., Networking Working Group, The NewReno Modification of TCP's Fast Recovery Algorithm, RFC 3782, Apr. 2004 (15 pages).

Stewart et al., Network Working Group, Stream Control Transmission Protocol, RFC 4960, Sep. 2007 (153 pages).

Ford et al., Internet Engineering Task Force, TCP Extensions for Multipath Operation with Multiple Addresses, draft-ietf-mptcp-multiaddressed-02, Oct. 25, 2010 (45 pages).

Patent Cooperation Treaty, "International Preliminary Report on Patentability," issued by the International Bureau in connection with PCT Application No. PCT/CA2011/000645, mailed on Sep. 19, 2013, 9 pages.

Extended European Search Report issued in European Application No. 11860484.2 on Nov. 11, 2014 (5 pages).

* cited by examiner

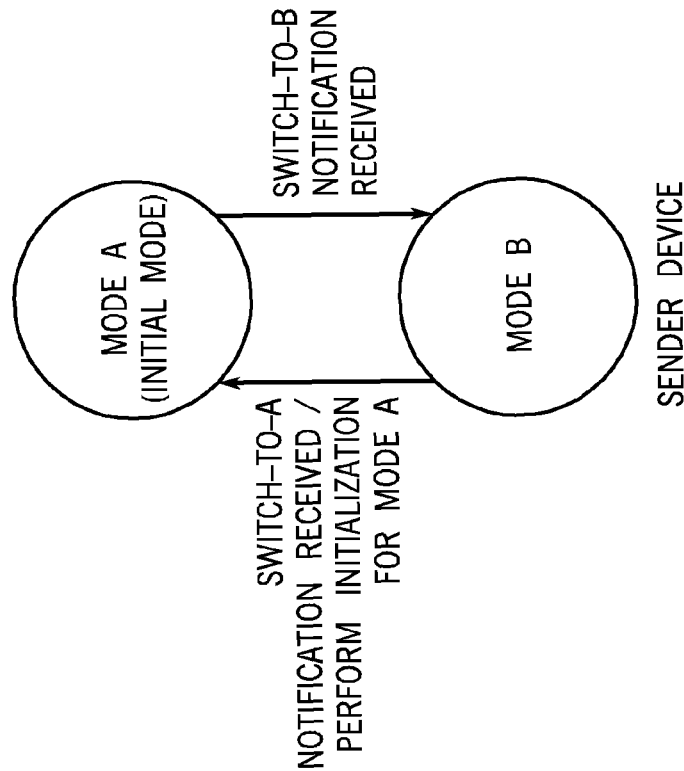
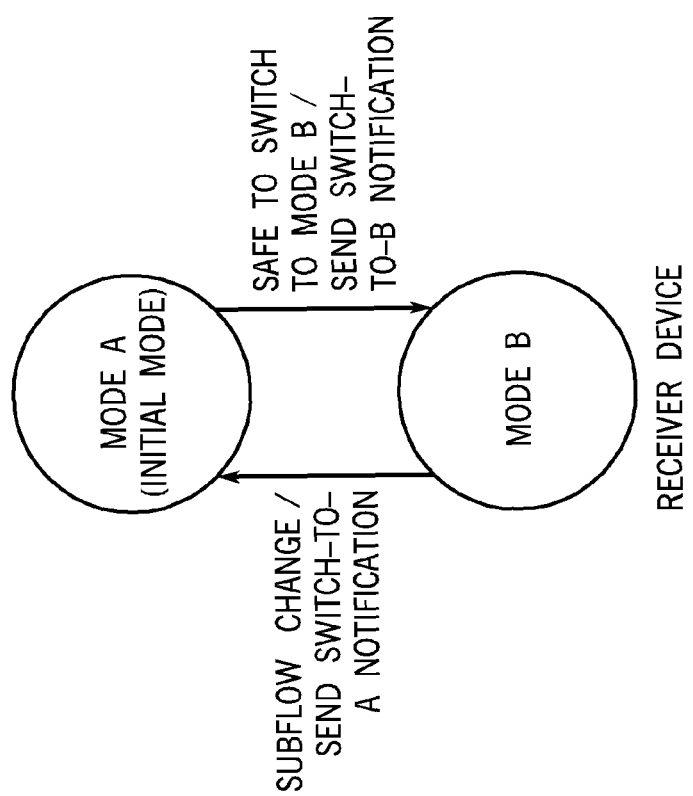

CONTROLLING NETWORK DEVICE BEHAVIOR

BACKGROUND

In a data network, such as an Internet Protocol (IP) network, a transport protocol can be defined to provide for reliable, ordered delivery of data packets. One example of such a transport protocol is the Transmission Control Protocol (TCP). Data communication using TCP over an IP network is referred to as a TCP/IP communication.

Traditionally, TCP/IP communication over a data network employs a single path for each connection between network devices. More recently, to improve communication performance (in the form of higher data throughput and improved resilience to network failure), Multipath TCP (MPTCP) has been defined to allow for TCP communication using multiple paths for each connection between network devices. However, various issues may exist with respect to MPTCP that may prevent efficient use of MPTCP in some scenarios.

BRIEF DESCRIPTION OF THE DRAWINGS

Some embodiments are described with respect to the following figures:

FIGS. 10 and 13 are state diagrams of operations of a receiver device, according to some embodiments;

FIG. 14 is a state diagram of operation of a sender device according to some embodiments;

DETAILED DESCRIPTION

In the ensuing discussion, reference is made to the Multipath Transmission Control Protocol (MPTCP), which allows for communication of data in a transport connection between network devices across multiple subflows of a network simultaneously. MPTCP is developed by the Internet Engineering Task Force (IETF). Although reference is made to MPTCP, it is noted that techniques or mechanisms according to some embodiments can be applied to other protocols that allow for a connection between network devices to employ multiple subflows simultaneously. A "connection" between network devices refers to a session that is established using a predefined procedure, such as a procedure defined by MPTCP, TCP (Transfer Control Protocol), or other protocol. A connection between network devices can be established over a network that may have one or multiple intermediate devices, such as middleboxes, routers, switches, firewalls, network address translators, proxies, and so forth. A subflow refers to a stream of packets belong to a connection (e.g., TCP connection) sent over a path. A path refers to a set of links between network devices—a path can be defined by a pair of addresses, such as a source address and a destination address. Multiple subflows of a connection can be provided over multiple paths.

Figure 1:
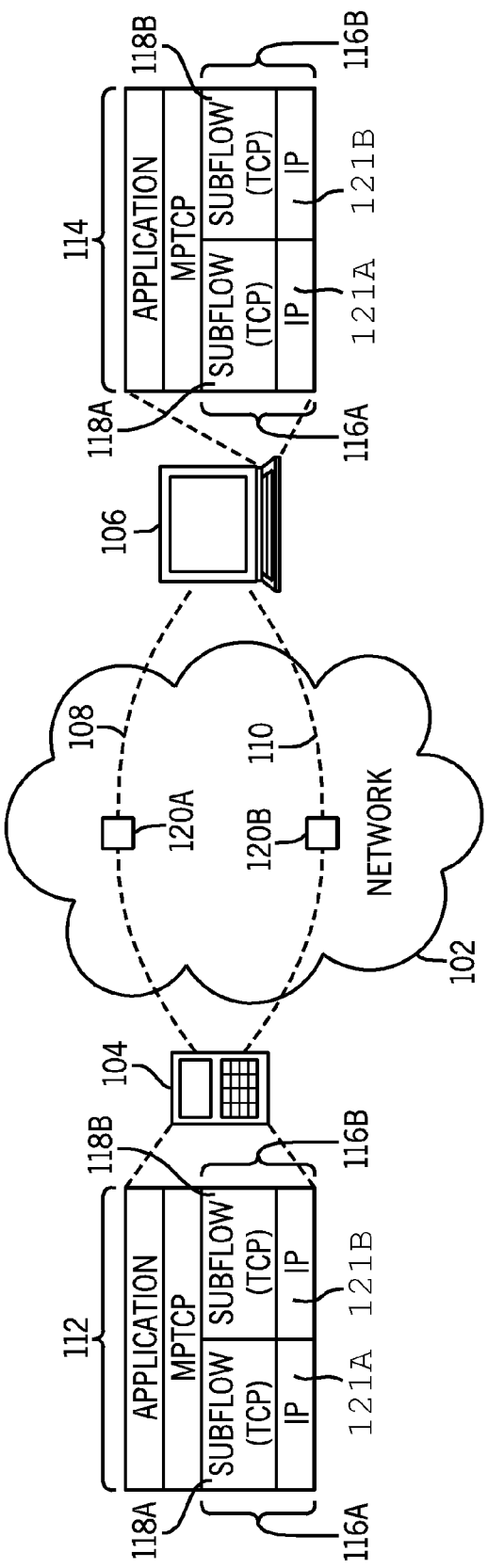
FIG. 1 is a block diagram illustrating a multipath transport arrangement in which embodiments can be incorporated.

FIG. 1 illustrates an example arrangement that includes a network 102 connected to a first network device 104 and a second network device 106. Although just two network devices are depicted, it is noted that the network 102 can be connected to additional network devices. Examples of network devices include personal digital assistants, mobile telephones, tablet computers, notebook computers, desktop computers, server computers, storage controllers, electronic appliances, or other types of electronic devices.

The example shown in FIG. 1 shows that multiple subflows 108 and 110 can be provided in a connection established between the network devices 104 and 106. Although just two subflows 108 and 110 are shown for the connection between network devices 104 and 106, note that the connection between network devices can have more than two subflows. It is also possible for the pair of network devices 104 and 106 to establish multiple connections, where each connection can be associated with its respective set of subflows. In some examples, the first subflow 108 can be part of a path over a mobile communications network, such as a cellular network. The second subflow 110 can be over a wireless local area network. In other examples, the subflow 108 or 110 can be part of a wired path.

As shown in FIG. 1, in implementations that employ MPTCP, each of the network devices 104 and 106 includes a respective MPTCP protocol stack 112 and 114. The protocol stack 112 or 114 includes an application layer (including application software) and an MPTCP layer (for implementing MPTCP functionality). For each subflow, there is one TCP/IP (Transmission Control Protocol/Internet Protocol) instance 116A or 116B in the protocol stack 112 or 114. Note that there are two TCP/IP instances 116A, 116B because there are two subflows in the example of FIG. 1. If there are more subflows for the connection between network devices 104 and 106, additional TCP/IP instances would be provided in the protocol stack 112 or 114.

Each TCP/IP instance 116A or 116B includes a respective TCP layer 118A or 118B and an IP layer 121A or 121B. The MPTCP layer defines communication over a connection at a connection level (or data level), while each TCP layer defines communication at a subflow level. Versions of IP are described by Request for Comments (RFC) 791, entitled "Internet Protocol," September 1981 (describing Internet Protocol Version 4 (IPv4)), or by RFC 2460, entitled "Internet Protocol, Version 6 (IPv6)) Specification," dated December 1998. A version of TCP is described in RFC 793, entitled "Transmission Control Protocol," dated September 1981. Although each protocol stack 112 or 114 is depicted with an MPTCP layer and TCP/IP instances, it is noted that protocol stacks according to other implementations can include other types of protocol layers. Also, not all layers of the protocol stack 112 or 114 are depicted; there may be other layers that are not depicted.

MPTCP is designed to be backward compatible with existing network components. In some cases, the network 102 may include one or multiple blocking intermediate devices 120A and 120B, also referred to as sequence hole blocking middle boxes. Examples of blocking intermediate devices include firewalls, network address translators, proxies (such as performance enhancing proxies), or any other intermediate device that is on the routing path of packets between a sender device and a receiver device and that prevents forwarding of packets to a destination, as an example when the intermediate device detects loss of continuity in sequence numbers in packets received by the intermediate device 120A or 120B. Stated differently, if the blocking intermediate device detects sequence holes in packets received by the intermediate device, then the blocking intermediate device will block the forwarding of packets having sequence numbers after or larger than the missing sequence number to the destination. In alternative implementations, the blocking intermediate device can block the forwarding of packets if the blocking intermediate device detects some other characteristic in a stream of packets from the sender device. A blocking intermediate device is on the path of a subflow when the blocking intermediate device is on the routing path of packets between a sender device and a receiver device.

In the example of FIG. 1, there are intermediate devices 120A and 120B provided in respective subflows 108 and 110. In alternative examples, a blocking intermediate device is provided in just one of the subflows 108 and 110. As yet another example, one or both of the intermediate devices 120A and 120B can be non-blocking intermediate devices (a non-blocking intermediate device allows packets to be forwarded to the destination even if there is a sequence hole in the packets). Assuming that the intermediate device 120A or 120B is a blocking intermediate device, such blocking intermediate device will block forwarding of packets along the respective subflow (108 or 110) if the blocking intermediate device detects a sequence hole along that subflow.

Figure 2:
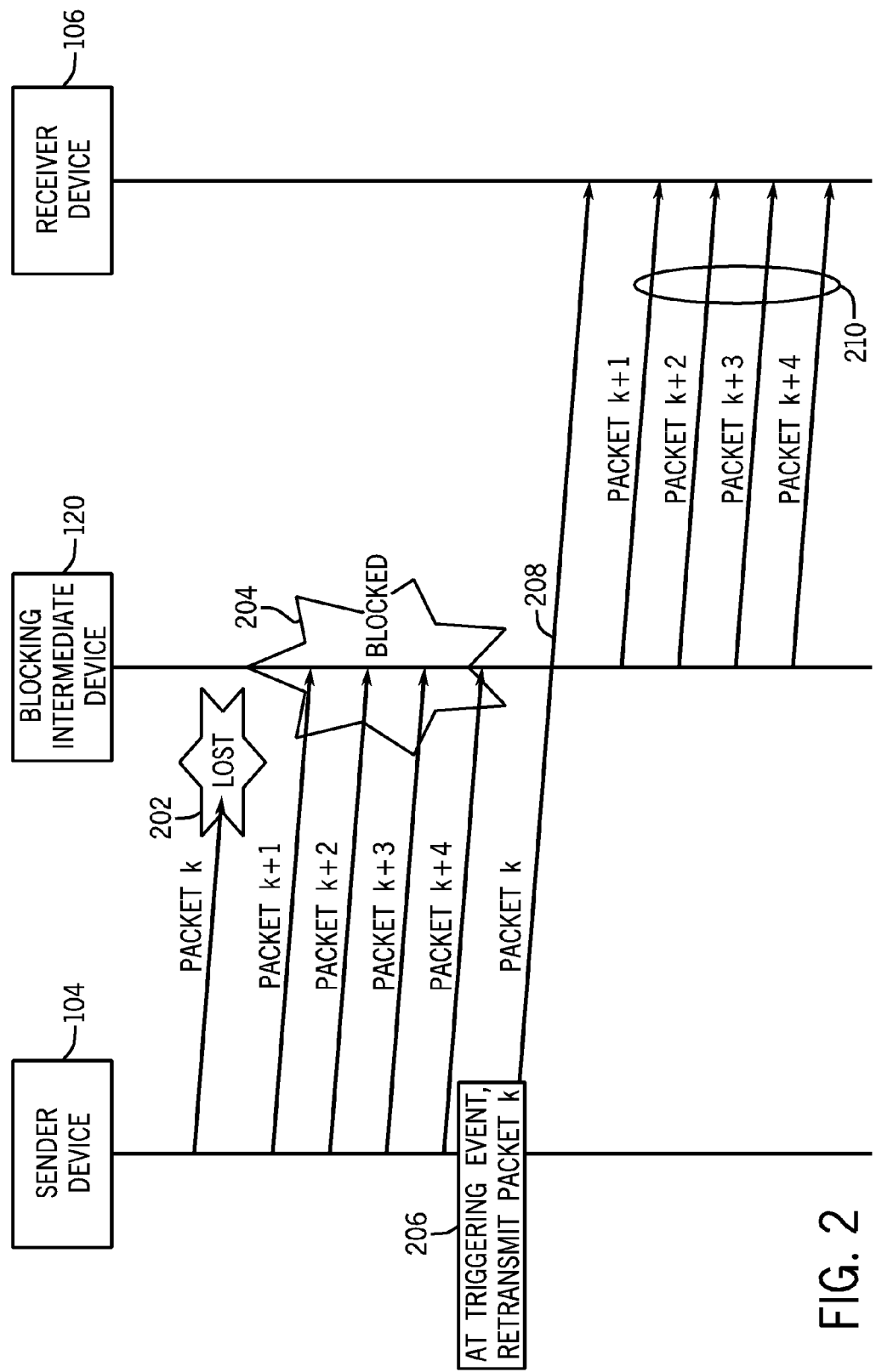
FIG. 2 is a message flow diagram illustrating loss of a packet that prevents other packets from reaching a receiver device.

FIG. 2 illustrates an example message flow diagram that illustrates the issue of packet loss occurring that causes a blocking intermediate device 120 (either 120A or 120B in FIG. 1) to block forwarding of packets. Although reference is made to transmitting packets in the present description, it is noted that "packet" can refer to a byte, a collection of bytes, or any other grouping of data. Note that according to TCP, sequence numbers are associated with bytes. With other protocols, sequence numbers can be associated with other groupings of data.

As shown in the example of FIG. 2, packet k (with sequence number s(k)) sent by a sender device (e.g., network device 104) is lost (202) before reaching the blocking intermediate device 120. A lost packet includes a packet that is sent by a sender device to a receiver device and is not received by the receiver device. FIG. 2 also shows subsequent transmission of packets k+1, k+2, k+3, and k+4 from the sender device 104 to the blocking intermediate device 120, having sequence numbers greater than s(k). The packets having respective sequence numbers s(k+1) to s(k+4) are blocked (204) by the blocking intermediate device 120, due to the sequence hole resulting from loss of the packet k.

As further shown in FIG. 2, in response to a triggering event, packet k is retransmitted (206), where the retransmitted packet k is received by the intermediate device 120 and forwarded (represented by arrow 208) to the receiver device (e.g., network device 106). After the retransmitted packet k is received by the blocking intermediate device 120, the blocking intermediate device 120 can release (210) packets k+1, k+2, k+3, and k+4 to receiver device 106.

In a different example, if the packet k was lost after receipt by the blocking intermediate device 120 and after the blocking intermediate device 120 has forwarded the packet having sequence number s(k) to the receiver device 106, the blocking intermediate device 120 will not block the packets having sequence numbers s(k+1) to s(k+4), since the blocking intermediate device 120 has already seen the packet having sequence number s(k).

Conventionally, to deal with the possible existence of a blocking intermediate device in a subflow, at least the following rules (referred to as "Rule 1" and "Rule 2") may be implemented. Rule 1 specifies that a missing packet in a particular subflow should be retransmitted on the same subflow. Thus, according to Rule 1, if a packet having a particular sequence number was lost in subflow 108, then the packet having the particular sequence number should be retransmitted on subflow 108. Rule 1 can be considered a retransmission rule at the subflow level.

Rule 2 specifies that a sender device has to keep data in the sender device's send buffer at the MPTCP connection level as long as the data has not been acknowledged at the connection level as well as on all subflows that the data has been sent on. Maintaining the data in the send buffer allows a sender device to retransmit the data if needed, on the same subflow or on a different subflow. Rule 2 can be considered a retransmission rule at the connection level.

As will be described in some examples discussed below, complying with Rule 1 or Rule 2 may be inefficient in some scenarios. Rules 1 and 2 are provided due to the possibility that a blocking intermediate device may be present on a subflow of a connection between network devices.

Retransmission Solutions

In accordance with some embodiments, to allow for more efficient use of network resources and to improve network communication throughput, techniques or mechanisms are provided to allow for a sender device (that is communicating with a receiver device over a connection) to change its behavior depending upon feedback received from the receiver device. In some implementations, a first retransmission solution (Retransmission Solution 1) is provided. As discussed below, this retransmission solution uses a probing mechanism for determining whether a blocking intermediate device is present. With Retransmission Solution 1, the sender device uses feedback from the receiver device to either (1) affirmatively determine that a blocking intermediate device does not exist in the path of a subflow, or (2) determine that the sender device is without knowledge of whether a blocking intermediate device is in the path of a subflow or cannot determine that a blocking intermediate device is in the path of a subflow. If the sender device detects condition (1) (that the sender device has affirmatively determined that a blocking intermediate device does not exist in the path of a subflow), then the sender device modifies its behavior with respect to communication over subflows of a connection between the sender device and the receiver device, by implementing a first behavior with respect to data transmission over subflows of the connection. The first behavior allows the sender device to operate without having to comply with Rule 1 or Rule 2, or both Rules 1 and 2.

In response to detecting condition (2) above (the sender device is without knowledge of whether a blocking intermediate device is in the path of a subflow), the sender device implements a second behavior, in which the sender device complies with either Rule 1 or Rule 2, or both.

In alternative implementations, a second retransmission solution (Retransmission Solution 2) is provided, in which the probing of Retransmission Solution 1 is not used. With Retransmission Solution 2, since probing is not used, the sender device is unable to affirmatively determine whether a blocking intermediate device exists or not in the path of a subflow, as can be done with Retransmission Solution 1. Instead, with Retransmission Solution 2, based on feedback from the receiver device, the sender device determines one of two conditions is present: (a) no blocking intermediate devices exists in a subflow, or a specific lost packet or any lost packet was lost after being forwarded from a blocking intermediate device; or (b) a blocking intermediate device exists, or all packets with a sequence number greater than the sequence number of a lost packet have been lost before reaching the blocking intermediate device or have been lost after the blocking intermediate device or have been discarded by the blocking intermediate device.

In response to detecting condition (a) above, the sender device implements a first behavior in which the sender device does not have to comply with Rule 1, but complies with Rule 2. On the other hand, in response to detecting condition (b) above, the sender device implements a second behavior in which the sender device has to comply with both Rule 1 and Rule 2.

With either Retransmission Solution 1 or Retransmission Solution 2 noted above, mechanisms or techniques are provided to allow the sender device to determine that the feedback actually came from the receiver device, and was not generated or altered by some intermediate device. Such mechanisms or techniques are discussed in a section entitled "Receiver Feedback Mechanisms or Techniques" provided further below.

Figure 3:
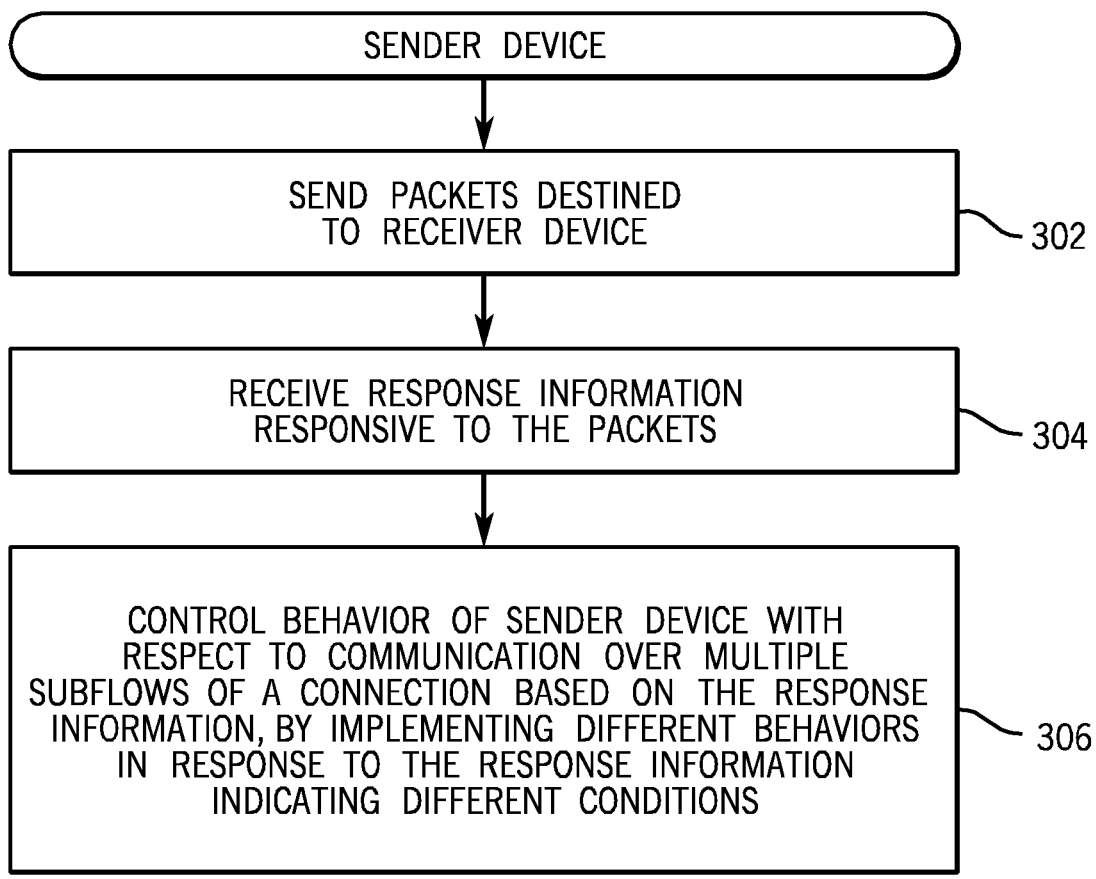
FIG. 3 is a flow diagram of a process of modifying behavior of a sender device in response to feedback from a receiver device, according to some embodiments.

FIG. 3 illustrates a process according to some embodiments. The sender device sends (at 302) packets over a network, where the packets are destined to a receiver device. The sender device receives (at 304) response information that is responsive to the packets sent by the sender device. The response information is considered the feedback from the receiver device mentioned above. The behavior of the sender device with respect to communication over multiple subflows of a connection is controlled (at 306) based on the response information. Controlling the behavior includes causing the sender device to implement different behaviors (first and second behaviors noted above) with respect to data transmission over subflows of a connection between the sender device and the receiver device, in response to the response information indicating respective different conditions. In some implementations, the sender device implements the first behavior with respect to data transmission over the subflows of a connection in response to the response information indicating condition (1) or (a) noted above, and the sender device implements the second, different behavior with respect to data transmission over the subflows of a connection in response to the response information indicating condition (2) or (b) noted above.

Additional details regarding the foregoing Retransmission Solution 1 and Retransmission Solution 2 are discussed further below.

Figure 4A:
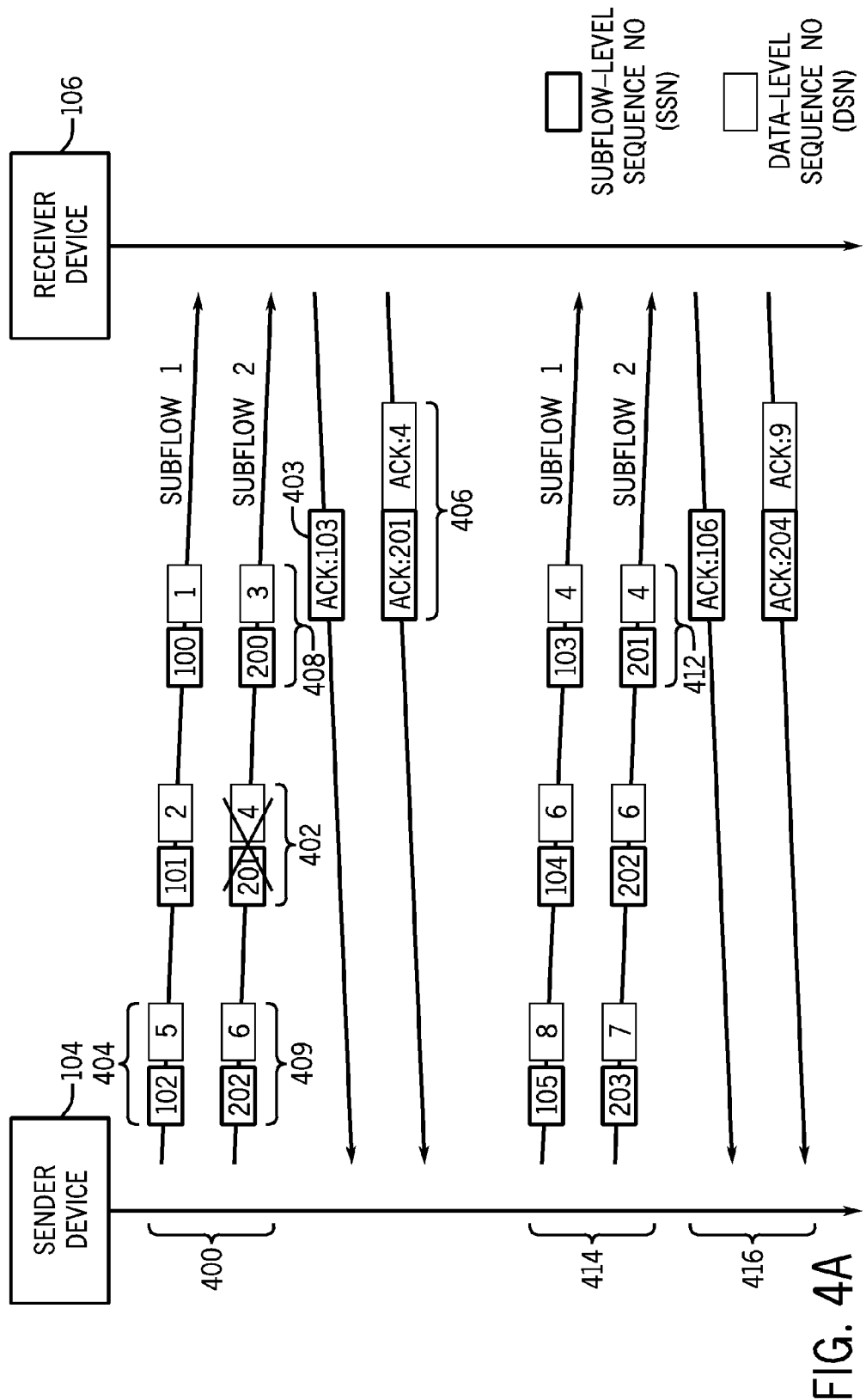
FIGS. 4A and 4B are message flow diagrams illustrating examples involving lost packets.

As discussed above, Rule 1 proposed for MPTCP forces the retransmission of lost packets on the same subflow that the lost packets were originally sent over. FIG. 4A illustrates an example packet retransmission scenario that is in accordance with Rule 1. In FIG. 4A, each packet over a respective subflow includes two sequence numbers: a subflow-level sequence number (SSN) and a data-level (or connection-level) sequence number (DSN). A subflow-level characteristic such as a sequence number is a characteristic that describes the properties of an individual subflow, i.e. a flow of data packets belonging to a path. A data-level or connection-level characteristic such as a sequence number is a characteristic of an MPTCP connection. The SSN is employed by the TCP layer 118A or 118B in the protocol stack 112 or 114 of FIG. 1. The DSN is used by the MPTCP layer in the protocol stack 112 or 114. Sequence numbers are used by each protocol stack to allow for reliable, ordered delivery of packets.

In FIG. 4A, various packets are sent from the sender device to the receiver device along subflows 1 and 2 in transmissions 400. In FIG. 4A, it is assumed that a packet 402 having SSN 201 and DSN 4 was lost in subflow 2. In response to the packets received over subflow 1, the receiver device sends an acknowledgement (ACK) message 403 to the sender device on subflow 1, where the ACK message is a cumulative acknowledgement indicating successful receipt of the packets along subflow 1, including packet 404 containing SSN 102 (as well as packets with SSNs 100 and 101). A cumulative acknowledgement is provided by the receiver device to acknowledge that the receiver device correctly received a packet in a stream (which in the example is packet 404 in subflow 1) that implicitly informs the sender device that the previous packets (packets with a lower sequence number) were also received correctly. In the ensuing discussion, reference to "ACK" indicates a cumulative acknowledgement. Other types of acknowledgements will be indicated with different abbreviations in the discussion below.

An acknowledgement message 406 provided in subflow 2 acknowledges successful receipt of a packet 408 on subflow 2, which has SSN 200 and DSN 3. Note that subflow 2 in the example of FIG. 4A is the subflow used for acknowledging the data level sequence number of packets received by the receiver device. In the example of FIG. 4A, the acknowledgement message 406 includes a subflow-level ACK:201 to acknowledge successful receipt of a packet (408) without any SSN holes containing SSN 200 along subflow 2, and data-level ACK:4 to acknowledge successful receipt of packets containing DSNs up to 3 (without any DSN holes) along both subflows 1 and 2.

Due to loss of the packet 402 in subflow 2, the acknowledgement message 406 sent from the receiver device to the sender device does not acknowledge the SSN of 202 and DSN of 6 in packet 409, since an SSN hole and DSN hole are present due to loss of the packet 402.

To comply with Rule 1 discussed above, the lost packet 402 (originally sent on subflow 2) has to be retransmitted on subflow 2 (the lost packet 402 may or may not be retransmitted on subflow 1 in parallel, which depends on the implementation of sender device's retransmission algorithms). In the example shown in FIG. 4A, the lost packet 402 is not retransmitted over subflow 1. The retransmitted packet is designated packet 412 in subflow 2. FIG. 4A also depicts further transmissions 414 of various packets on subflows 1 and 2, including the retransmitted packet 412 in subflow 2. Acknowledgement messages (416) are sent by the receiver device to the sender device in response to the packet transmissions 414. It is assumed that all packets sent in transmissions 414 were successfully received by the receiver device.

The retransmission of the packet 412 over the same subflow of the lost packet 402 is performed to deal with the possibility of the presence of a blocking intermediate device on subflow 2, which does not tolerate sequence holes. If another subflow, such as subflow 1, is a better choice for sending the retransmitted packet 412 (such as due to subflow 1 having lower congestion), then Rule 1 would cause reduced data throughput performance since the retransmitted packet has to be sent over the same subflow, which may be experiencing higher congestion or have other issues. As another example, it may be the case that subflow 2 may actually be broken, in which case the sender device has to keep resending the lost packet over the same subflow until the sender device determines that subflow 2 is broken, which may take some time and also wastes network resources such as network bandwidth. In specific examples, subflow 2 may be a wireless link, and retransmission of the packet 412 over this wireless link may be expensive in terms of usage of radio bandwidth and radio resources. In some examples, retransmission of a TCP packet may trigger even more redundant radio level retransmissions, such as radio level retransmissions due to poor radio link quality.

Figure 4B:
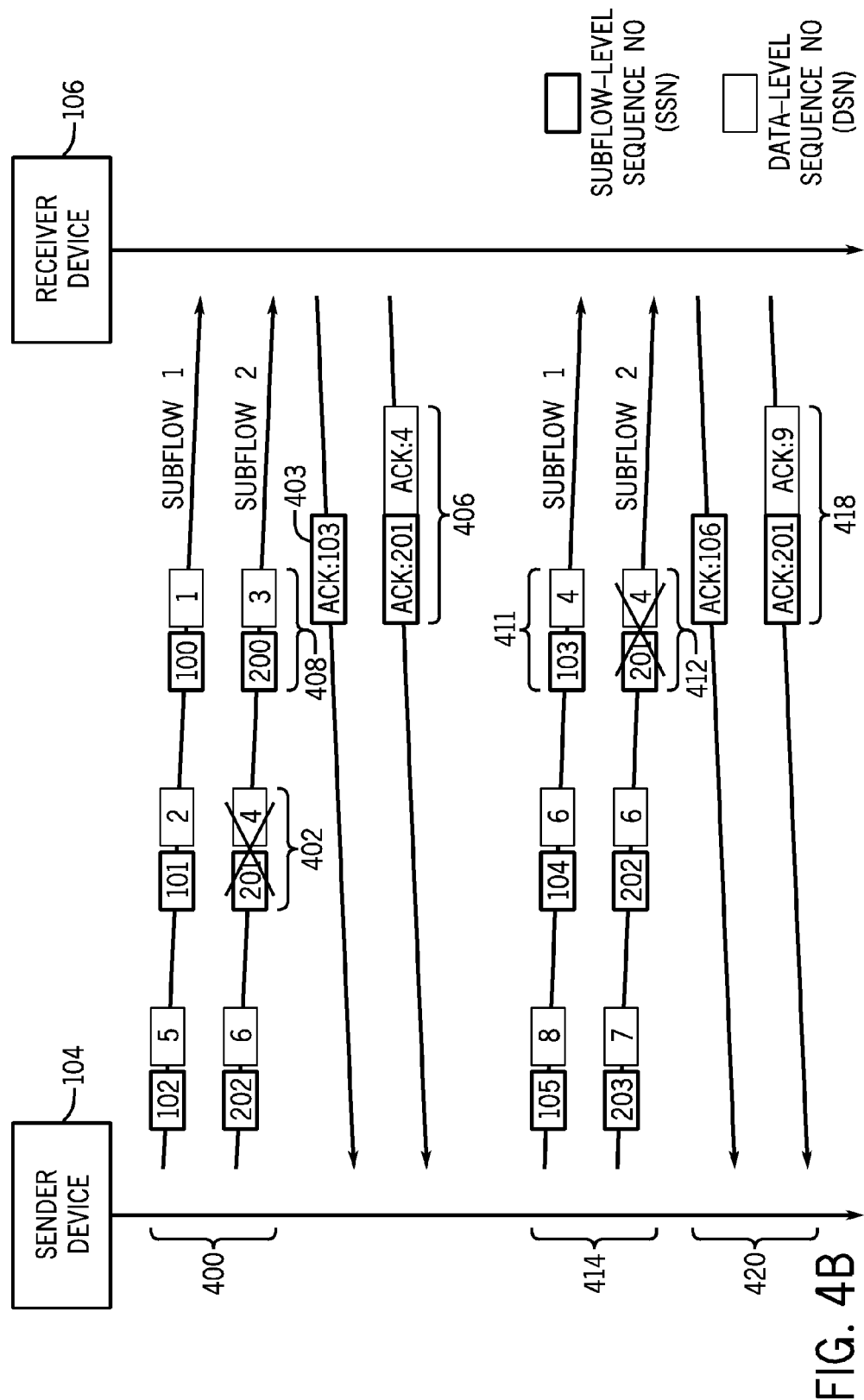

FIG. 4B is a message flow diagram illustrating application of Rule 2 discussed above. In the FIG. 4B example, transmissions 400 and 414 are similar to respective transmissions 400 and 414 in FIG. 4A. In FIG. 4B, packet 402 originally sent in subflow 2 was lost, which triggered retransmission of the packet, in the form of retransmitted packet 412 in subflow 2 as well as packet 411 in subflow 1. However, in the example of FIG. 4B, it is assumed that retransmitted packet 412 in subflow 2 was also lost, but the retransmitted packet 411 was received successfully by the receiver device.

In response to packet transmissions 414 over subflows 1 and 2, the receiver device sends respective acknowledgement messages (420) to the sender device. Packets with DSN up to 8 were sent by the sender device and received by the receiver device over one or both of the subflows. As a result, the receiver device sends a data-level cumulative acknowledgement sequence number of 9, as indicated in the acknowledgement message 418. However, note that due to failure to receive the retransmitted packet 412, the SSN of the subflow-level acknowledgment in the acknowledgement message 418 is 201, to indicate that the last successfully received packet in subflow 2 without an SSN hole has an SSN of 200 (namely packet 408 in the FIG. 4B example).

If Rule 2 does not have to be complied with, the sender device, after receiving the acknowledgement message 418 with a DSN of 9, would have been able to clear packets in the send buffer of the sender device up to DSN 8 at the MPTCP connection level. However, because packets with DSNs 4, 6, and 7 may still have to be retransmitted on subflow 2, due to lost packet 412, the sender device cannot clear its send buffer at the MPTCP connection level for packets with DSN 4, 6, and 7, and such packets would have to be maintained in the send buffer of the sender device, despite the fact that a data-level ACK message has already been sent acknowledging receipt of the DSNs up to DSN 8. This is wasteful of the send buffer storage capacity.

In the case where the receiver device is able to send a selective acknowledgement (SACK) instead of a cumulative ACK (where the selected acknowledgement is able to identify respective DSNs after a sequence hole received by the receiver device), the sender device only has to maintain packet(s) with DSN 4 in the send buffer, and does not have to maintain the packets having DSNs 6 and 7. Even in this latter case, the send buffer of the sender device still has to keep packet(s) having DSN 4, which consumes storage capacity.

As discussed above, in accordance with some embodiments, techniques or mechanisms are provided to allow the sender device to modify its behavior according to feedback received from the receiver device. In some embodiments, a probing-based solution (Retransmission Solution 1 discussed above) allows the sender device to perform subflow probing to affirmatively determine that a blocking intermediate device does not exists on a subflow between the sender device and the receiver device. Alternatively, Retransmission Solution 2 does not use the probing technique, but the sender device is still able to modify its behavior based on feedback received from the receiver device in response to messaging from the sender device.

Figure 5:
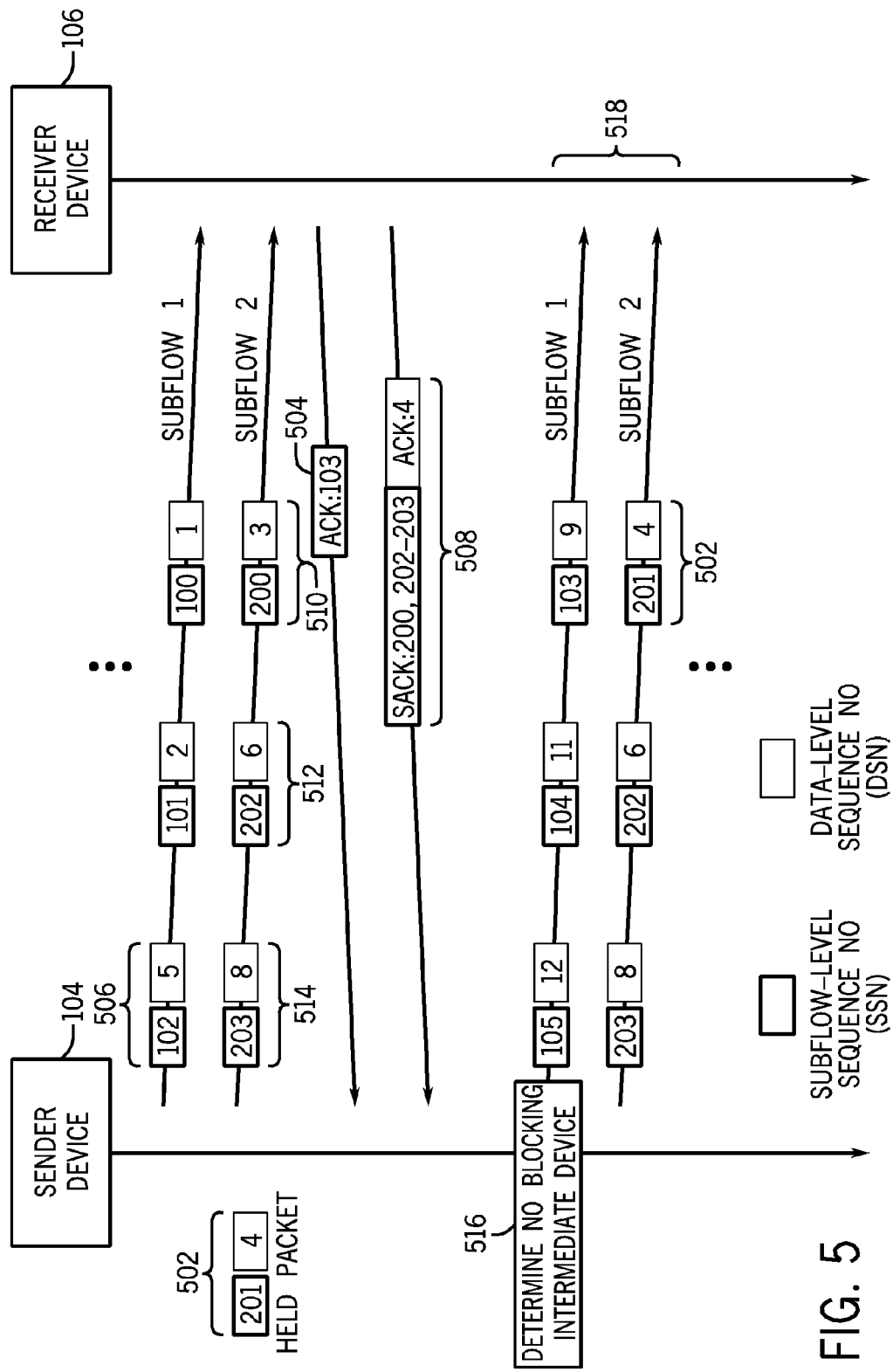
FIG. 5 is a message flow diagram of a process of a first retransmission solution according to some embodiments.

FIG. 5 illustrates a probing-based solution (Retransmission Solution 1) according to some embodiments. For determining whether there is a blocking intermediate device between the sender device and the receiver device, the sender device creates a sequence number hole in a subflow by holding one or multiple packets (by not transmitting such held one or multiple packets in the sequence of packets to be transmitted in the subflow). Such held packet(s) is (are) also referred to as "probing packet(s)." Based on feedback from the receiver device in response to the sent packets with a sequence number hole, the sender device can determine whether a blocking intermediate device exists on the subflow.

As shown in FIG. 5, the sender device holds packet 502 in subflow 2, thereby creating a sequence number hole in subflow 2. More generally, the sender device holds one or more packets (e.g., packet 502 in FIG. 5) from a subflow belonging to a connection but sends packet(s) with higher DSN(s) (e.g., 512 and 514) to create a sequence number hole in the subflow. The held packet is not sent on any subflow, but rather is stored in a memory, buffer, or other storage of the sender device.

The receiver device sends a data-level acknowledgement to indicate what packets belonging to the connection (on multiple subflows) have been received. The receiver device also sends a subflow-level acknowledgement on the subflow being probed (subflow 2 in FIG. 2) to indicate what packets have been received over the subflow being probed. More specifically, a subflow-level ACK message 504 in subflow 1 provides a cumulative acknowledgement of packets received in subflow 1, with the ACK message 504 containing acknowledge SSN 103 to indicate successful receipt of packet 506 containing SSN 102.

An acknowledgement message 508 in subflow 2 uses selective acknowledgement (SACK) at the subflow level. The subflow-level SACK in message 508 allows the receiver device to indicate successful receipt of a packet 510 before the sequence number hole, and packets 512 and 514 after the sequence number hole in subflow 2. The cumulative acknowledgment (ACK) at the connection level in the acknowledgement message 508 provides cumulative acknowledgement of successful receipt of packets containing DSNs up to 3 in both subflows 1 and 2.

The sender device can determine from the acknowledgement message 508 that the receiver device successfully received packets having SSNs having values greater than the value of the SSN (201) of the packet 502 that was held by the sender device. From this, the sender device can determine (at 516) that there is no blocking intermediate device between the sender device and the receiver device in subflow 2. On the other hand, if the SACK in the acknowledgement message 508 would have contained just the SSN 200 (and not 202 and 203), the sender device would not be able to determine that there is no blocking intermediate device in subflow 2. In such a scenario, the sender device is without knowledge of whether the blocking intermediate device is in subflow 2.

Further transmissions 518 are sent in the example of FIG. 5, including the release of the held packet (probing packet) 502 after determining that there is no blocking intermediate device. Releasing a held packet refers to removing the held packet from memory, buffer, or other storage and sending the packet to a receiver device. From the receiver device's point of view, the packet 502 looks as if it was delayed by the network. While one or more packets (e.g., packet 502) are being held, the sender device ignores any duplicated ACKs for the packet 502. A duplicated ACK is an ACK repeatedly sent for a packet having sequence number n when the receiver device detects packet(s) having sequence number(s) greater than n (but the receiver has not yet received packet n). Thus, for example, if the receiver device did not receive packet n, but receives a packet n+1, the receiver device sends a duplicated ACK for sequence number n. If the receiver device later receives another packet n+2, then the receiver device will send another duplicate ACK for sequence number n. The duplicate ACKs informs the sender device that a sequence hole has been detected at the receiver device.

A similar procedure according to FIG. 5 can be performed for probing subflow 1 to determine whether a blocking intermediate device exists in subflow 1.

If the sender device determines that no blocking intermediate device is present in a particular subflow, then the sender device operates assuming sequence number holes are allowed on the particular subflow in the direction from the sender device to the receiver device. In other words, the sender device can perform data communication over the particular subflow from the sender device to the receiver device without complying with Rule 1 or Rule 2, or both. Thus, if there is no blocking intermediate device in subflow 2, the sender device can retransmit a lost packet on a different subflow (e.g., subflow 1) than the subflow where the lost packets were originally sent. As an example, the sender device can choose the subflow with the lowest congestion or other criteria. In addition, if there is no blocking intermediate device, the sender device can release all packets in its send buffer at the connection level as soon as the sender device receives an acknowledgement at the connection level that the packets have been received. By choosing not to comply with Rule 1 or Rule 2, or both, retransmission efficiency can be improved (e.g., to provide improved network throughput), and send buffer usage efficiency at the sender device can also be improved.

On the other hand, if the probing performed according to FIG. 5 indicates that the sender device is without knowledge of whether a blocking intermediate device exists in a subflow, then the sender device would comply with Rule 1 and Rule 2 discussed above for subflow 2.

Figure 6:
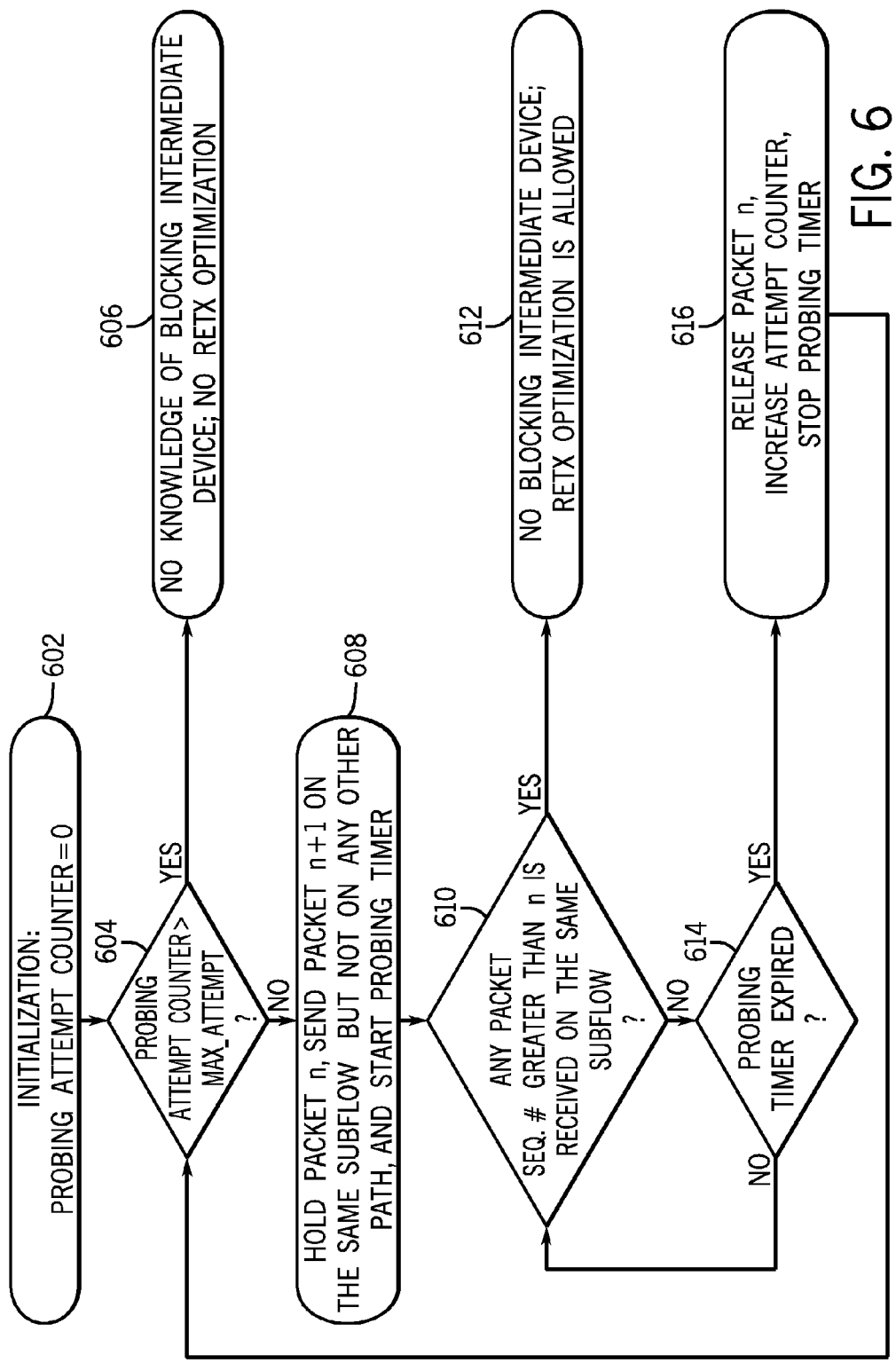
FIG. 6 is a flow diagram of a flow diagram of a process of the first retransmission solution according to further embodiments.

FIG. 6 is a flow diagram of a process performed by a sender device to perform path probing (Retransmission Solution 1) according to some implementations. The process of FIG. 6 can be performed each time a new subflow is created, or in response to some other event (such as the subflow changing its characteristics). In the FIG. 6 example, it is assumed that there is a predefined maximum number of attempts threshold specifying the maximum number of probes of a subflow allowed at the sender device for each iteration, i.e. that the sender device can send. In the example of FIG. 6, this maximum threshold is expressed as Max_Attempt. Also, a probing attempt counter is provided to count the number of attempts. The maximum threshold Max_Attempt can be a configured value set by configuration of the sender device by the user of the sender device or configured by an operator and delivered by the operator to the sender device with signaling information, where an operator can be the entity deploying the MPTCP solution in the sender device, the receiver device and the network.

In addition, a probing timer is used for each subflow of a connection. The sender device starts the probing timer for a given subflow when the sender device starts the probing and creates a sequence number hole by holding one or more packets. In some examples, it is assumed that the probing timer starts at a non-zero timeout value, and decrements over time until the probing timer reaches a threshold value (such as zero), at which point the probing timer is considered to have expired. In different examples, the probing timer can start at an initial value (such as zero) and increments over time, with the probing timer expiring when the probing timer reaches some upper threshold timeout value.

Initially, the probing attempt counter is set to zero (at 602) when a subflow is established or the subflow characteristics have changed. Next, the process of FIG. 6 determines (at 604) whether the probing attempt counter has a value greater than Max_Attempt. If so, then a determination (at 606) is made that the sender device is without knowledge regarding whether there is a blocking intermediate device and thus retransmission optimization is not performed (in other words Rules 1 and 2 are complied with). In some embodiments, the sender device attempts one or more probing. The sender device increments the value of the probing attempt counter with each attempt. If the probing attempt counter reaches a value greater than Max_Attempt, the sender device does not attempt any further probing for the subflow in the current iteration. Note, however, that the sender device can attempt probing at a later time.

If the probing attempt counter is not greater than Max_Attempt (as determined at 604), then the sender device holds (at 608) at least one packet having sequence number n, but sends a packet having sequence number n+1 on the subflow to be probed. The held packet having sequence number n is not sent on any other subflow. Also, the sender device starts the probing timer.

The sender device determines (at 610) whether an acknowledgement has been received from the receiver device that selectively acknowledges receipt of packet(s) with sequence number(s) greater than n. If so, then the sender device determines (at 612) that there is no blocking intermediate device on the path of the subflow being probed, and therefore, retransmission optimization is allowed (the sender device does not have to comply with Rule 1 or 2 or both for the subflow being probed).

When holding one or more packets, the sender device should not hold them too long to avoid impacting performance of the subflow. For example, acknowledgements of packets having sequence numbers after n may be lost, delayed or blocked, in which case the sender device may hold the packet(s) for too long if the sender device does not complete the probing process of FIG. 6 until receipt of such acknowledgements. To avoid such issues, the probing timer and the predefined threshold specifying a maximum number of probing attempts (Max_Attempt) are used. The sender device determines how long one or more packets are held by using the probing timer and the predefined threshold specifying a maximum number of probing attempts (Max_Attempt).

If the probing timer expires (as determined at 614) before the sender device has received acknowledgement messages (such as a DACK or a SACK) for packets with a SSN(s)

higher than the SSN of the held packet(s), the sender device releases (at 616) the held packet(s) and stops the probing timer. However, if the sender device receives the DACK or SACK as described above before the probing timer expires, then the sender device proceeds to task 612. If the probing timer expires, the sender device determines that it does not know whether there is a blocking intermediate device and the sender device reattempts the probing at some later time. In some embodiments, the sender device reattempts the probing after a probing reattempt delay, Probing_Reattempt_Delay, configured in the device. When the probing timer expires, the sender device starts a timer Probing_Reattempt_Timer and sets it to the value Probing_Reattempt_Delay. In some embodiments, when the Probing_Reattempt_Timer_expires, the sender device reattempts the probing. In other embodiments, the sender device does not reattempt probing before the Probing_Reattempt_Timer expires. In other embodiments, the sender device reattempts the probing at any time after the Probing_Reattempt_Timer expires and does not reattempt the probing before the Probing_Reattempt_Timer expires.

After the probing is done and it is determined that there is no blocking intermediate device in the path of a particular subflow, if some packets are lost in the particular subflow (e.g., subflow 1), but these lost packets were retransmitted over an alternate subflow (e.g. subflow 2) successfully (i.e. Rule 1 not complied with), the sender device does not retransmit the lost packets over subflow 1. In some examples, the sender device uses instead an option (referred to as a "re-sync" option) to instruct the receiver device to skip the packets with certain SSNs by providing the SSNs of the packets to be skipped or the largest SSN of the packet to be skipped, namely the lost packets successfully retransmitted by the sender device and successfully received by the receiver device over the alternate subflow. Upon receiving the "re-sync" option, or upon determining that the sender device uses the "re-sync" option, the receiver device moves the SSN forward to the value indicated by the sender device or to the largest value of the SSNs indicated by the sender device, and does not request retransmission of the missing packets.

Path probing as performed in FIG. 6 for a subflow is repeated if the subflow changes. The subflow change may be visible to the sender device, such as due to an IP address change. Upon determining a subflow change (e.g. a change in the IP address, or a change in the access network such as when the sender device or the receiver device or both move from one access network to another access network, etc.), the sender device performs path probing. In other scenarios, a subflow change may not be visible to the sender device, such as when Mobile IP is used. In the latter case, the receiver device can send signaling to the sender device so that the sender device can initiate a new probing process. Upon receiving an indication from the receiver device, the sender device initiates path probing. The receiver device can send this signaling or indication to the sender device in a variety of ways. For example, the receiver device sends a new TCP option (in a TCP message) to the sender device to notify the sender device of the subflow change and to provide a reason for the change, e.g., the receiver device moved from one access network to another access network. Upon receiving such signaling, if the sender device determines that the subflow changed (e.g., the IP address of the sender device changed or the sender device received an indication from the receiver device of a path change), the sender device performs path probing according to FIGS. 5 and 6.

In some implementations, various constraints can be set with respect to setting a timeout value of the probing timer used in FIG. 6.

According to constraint (1) set forth below, the probing timer timeout value should be set at least larger than one round trip time (RTT) (time for data to go from the sender device to the receiver device plus the time for a responsive acknowledgement to go from the receiver device to the sender device) to allow enough time for the sender device to receive the feedback from the receiver device.

$$T_{probing} > RTT_{release}, \quad (1)$$

where $T_{probing}$ is the probing timer value, and
$RTT_{release}$ is the RTT value when the probing packet (the held packet) is released.

In the foregoing, it is assumed that the probing timer starts at $T_{probing}$, and decrements to zero, at which point the probing timer expires.

Another constraint, constraint (2), specifies that the probing timer timeout value should not be too large for various reasons. First, the delay in performing the probing should be within acceptable limits, such as per requirements of an application in the sender device. Constraint (2) is expressed as:

$$T_{probing} < D_{app}, \quad (2)$$

where
$D_{app}$ is the delay limit per application requirement.

A further constraint, constraint (3), specifies that the probing timer timeout value should be set to avoid an increased likelihood of TCP timeout (which occurs when a sender device fails to receive an acknowledgement of a sent packet within a predefined timeout duration). During the time a packet is held by the sender device during the probing process, there is one less packet transmitted than in the normal case. One less packet transmission may result in one less acknowledgement from the receiver device. In some scenarios of packet loss, one less acknowledgement can make the difference between (1) reception of k (where k is a preconfigured number) duplicate acknowledgements and avoidance of timeout, and (2) reception of k–1 duplicate acknowledgements and the sender device timing out.

When a packet having sequence number n is lost, any receipt of packets having subsequent sequence numbers (e.g., n+1, n+2, etc.) will cause the receiver device to send a duplicate acknowledgement (for sequence number n) with each receipt of such packet(s) with subsequent sequence numbers. Receipt by the sender device of k duplicate acknowledgements of sequence number n is an indication to the sender device of loss of the packet having sequence number n. If the sender device can take steps to address a lost packet in response to receipt of k duplicate acknowledgements of sequence number n, then a fast retransmission mechanism can be performed at the sender device where the sender device does not have to wait for a timeout for retransmission of the lost packet having sequence number n.

To avoid the possibility of timeout at the sender device, the probing timer value should be set according to the following further constraint (3):

$$T_{probing} < \min_{all\ the\ unACKed\ Packets} (T_{remain} - RTT_{upbound}), \quad (3)$$

where
$T_{remain}$ is the remaining time of the timeout timer for an unacknowledged packet, and $RTT_{upbound}$ is the maximum of the past RTT values at the sender device.

Figure 7:
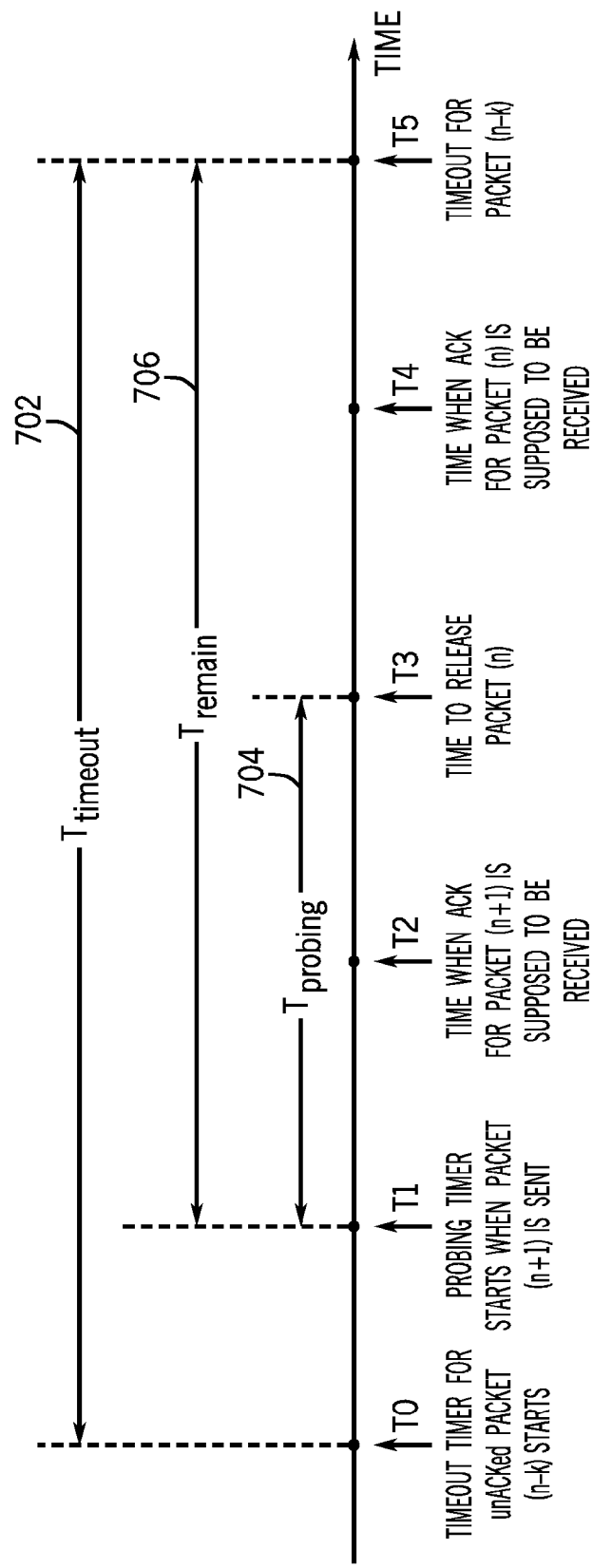
FIG. 7 is a timing diagram illustrating various timing relationships.

FIG. 7 is a timing diagram to illustrate the timing relationships noted above. Time T0 is the time at which a timeout timer for an unacknowledged packet (n−k) is started. The overall timeout duration ($T_{timeout}$) is represented by 702. If an acknowledgement of packet n−k is not received by time T5 (which is the timeout duration after T0), then timeout will occur at the sender device for packet (n−k).

In the example of FIG. 7, the probing timer is started at Time T1, when packet (n+1) is sent. Note that the probing packet (held packet) is packet n. The probing timer value ($T_{probing}$) is represented by duration 704. The value $T_{remain}$ (706) is the remaining time of the timeout timer for unacknowledged packet (n−k), as measured from the start of the probing timer (T1).

As illustrated in FIG. 7, time T2 represents a time when an acknowledgement of packet (n+1) is supposed to be received. If the acknowledgement for packet (n+1) is not received by time T3, which is $T_{probing}$ after T1, then the sender device will release the held packet (packet n). Time T4 represents the time when the acknowledgement for packet n is supposed to be received.

According to constraint (3) noted above, the value of $T_{probing}$ should be less than the minimum of ($T_{remain}$−$RTT_{upbound}$) for all unacknowledged packets.

It is possible that an appropriate $T_{probing}$ value cannot be found to satisfy constraints (1), (2) and (3) above. To avoid such issue and to reduce likelihood of timeout, alternative embodiments involve the sender device splitting a probing packet into two (or more) packets of smaller sizes. The sender holds one of the split packets, and transmits the other(s). In such alternative embodiments, the number of packets transmitted is at least the same as (or greater than) in the normal case, and therefore there is no decrease in robustness with respect to timeout. In such case, the probing timer value only has to satisfy constraints (1) and (2).

The foregoing describes details regarding some implementation of Retransmission Solution 1. An alternative solution (Retransmission Solution 2) does not employ probing.

In some embodiments according to Retransmission Solution 2, the sender device and the receiver device behave as legacy TCP devices until loss of a packet, such as packet n, occurs. Packet loss is detected as in regular TCP, such as through subflow-level feedback from the receiver device or timeout. The mechanisms described in the section below titled "Feedback Mechanisms or Techniques" are used so the sender can determine with high confidence that the feedback came from the receiver and was not a feedback generated or altered by an intermediate device.

In some implementations, the sender device detects that one or more packets are lost when the sender receives multiple duplicate subflow-level ACKs with the same ACK number. The receiver device sends duplicate acknowledgements when the receiver device receives one or more packets with higher SSNs than the SSN of the lost packet.

Alternatively, the sender device determines that one or more packets are lost when the TCP timeout timer expires.

Figure 8:
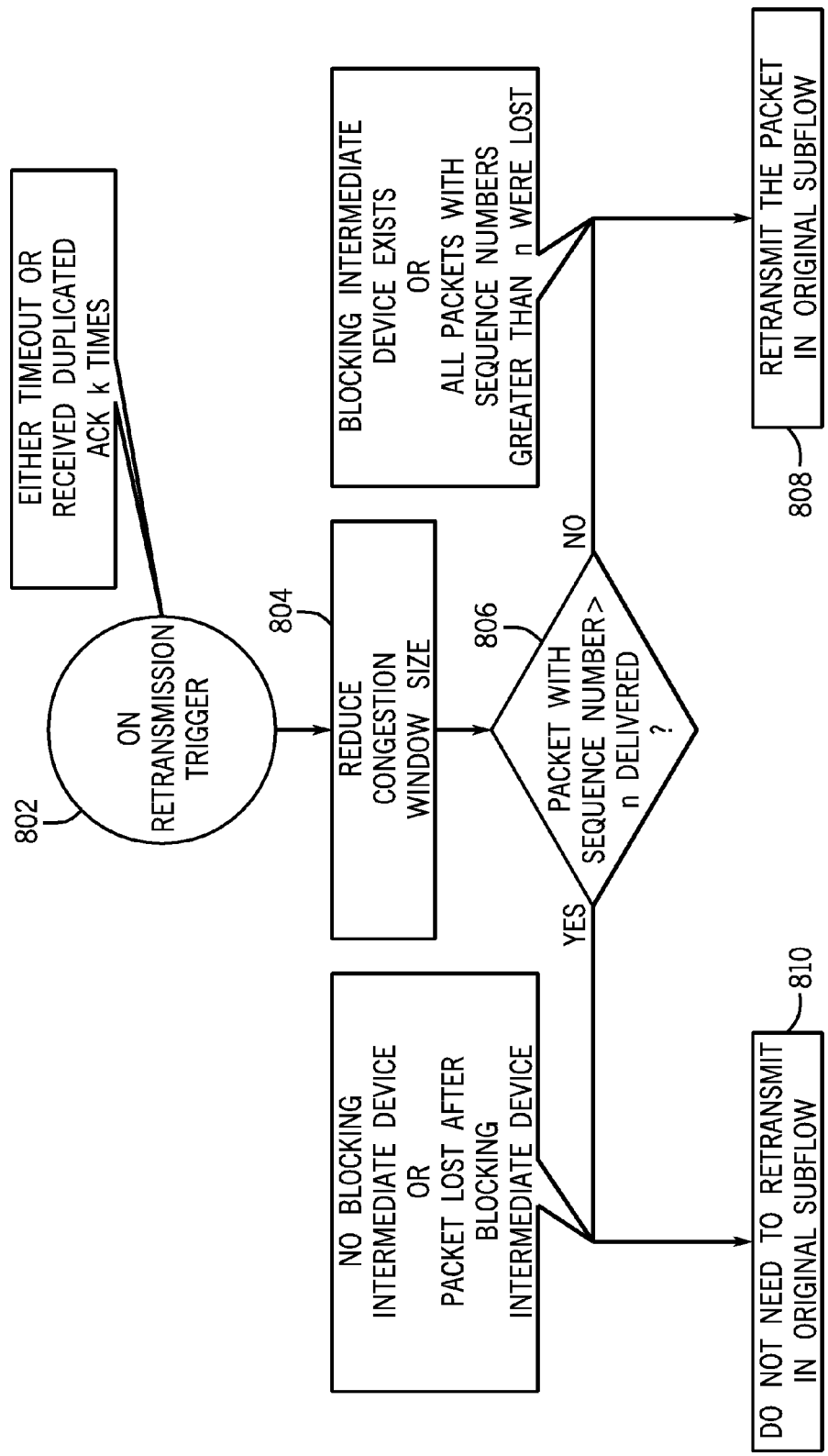
FIG. 8 is a flow diagram of a process of a second retransmission solution, according to alternative embodiments.

As shown in FIG. 8, when the sender device determines that one or more packets are lost (triggering event 802), the sender device reduces (at 804) a congestion window size based on TCP mechanisms. According to TCP, a sender device can maintain a congestion window for specifying how many bytes of data the sender device is allowed to send before the sender device has to receive an acknowledgement from the receiver device. In response to detection of packet loss, various TCP mechanisms are available to reduce the size of the congestion window.

Detection that a packet is lost can be based on receiving k duplicate ACK messages (for packet having SSN n) or the sender device timing out after the predefined timeout duration from when the packet having SSN n was sent. When the sender device determines (at 806) that a packet with SSN n is lost, if the sender device has not received an indication (in the form of an acknowledgement, such as a subflow-level SACK) that any packet with SSN greater than n has been delivered to the receiver device, then the sender device determines that either a blocking intermediate device is present or all packets with sequence numbers greater than n have been lost or are extremely delayed (and thus has resulted in a timeout). In this case, the sender device retransmits (at 808) the lost packet (having SSN n) on the original subflow (complies with Rule 1). In task 808, the sender device can also comply with Rule 2.

Alternatively, after the sender device detects that a packet with SSN n is lost, if the sender device receives (as determined at 806) an indication that the receiver device has received one or more packets with SSN greater than n, then that indicates either that no blocking intermediate device is present, or packets were lost after transmission by an intermediate device. In this case, the sender device has the option to skip (at 810) retransmitting the packet with SSN n on the original path, if the packet has already been retransmitted over an alternate subflow, or to retransmit the packet on the most suitable subflow (e.g., least congested subflow). In other words, the sender device does not have to comply with Rule 1.

Congestion Window Size Setting Mechanism or Technique

As noted above, according to TCP, a sender device maintains a congestion window for specifying how many bytes of data the sender device is allowed to send before the sender device has to receive an acknowledgement from the receiver device. More generally, a "congestion window" can refer to any time duration or indication of amount of data following transmission of a particular packet, in which the sender device is allowed to continue to send further data in the congestion window. Upon expiration of the congestion window (either the time duration of the congestion window has passed or the amount of data indicated by the congestion window has been exceeded), the sender device will no longer be able to transmit further data, until the congestion window is updated.

In accordance with some embodiments, mechanisms or techniques are provided for setting the size of a congestion window that potentially can utilize information received over multiple subflows. For example, a data-level acknowledgement (DACK) or selective ACK (SACK) can be received on a subflow different from a given subflow where a subflow-level ACK was lost. By using information from acknowledgement information received on all the subflows to set the size of the congestion window when subflow-level ACKs in the given subflow were lost, the sender device will be able to control the congestion window size in a more efficient manner than if the sender device had to trigger adjustment of the congestion window size based on acknowledgment information carried in just the given subflow.

Congestion window size setting mechanisms exist that allow a sender device to reduce a congestion window size upon receipt of k duplicate acknowledgements carrying sequence number n (which indicates loss of the packet having sequence number n). For example, some TCP mechanisms divide the congestion window size by two (in other words, the congestion window size is reduced by half) in response to detecting k duplicate acknowledgements. One example of such a TCP mechanism is the NewReno mechanism, as described in RFC 3782, entitled "The NewReno Modification to TCP's Fast Recovery Algorithm," dated April 2004. Another TCP mechanism for reducing window size is the TCP Reno mechanism. Other mechanisms can also be employed in other examples.

When TCP timeout occurs (due to a predefined time duration passing with no acknowledgement received in response to a particular packet being sent), the congestion window size is usually reduced to a relatively small value, such as 1. Reducing the congestion window size to such a relatively small value can adversely affect performance of the sender device.

By being able to reduce the congestion window size by a smaller amount (such as by dividing the congestion window size by half) as compared to reducing the congestion window size to 1 (when a timeout occurs), improved sender device performance can be provided. As noted above, some TCP mechanisms reduce the congestion window size by half in response to receiving k (where k is a preconfigured number) duplicate acknowledgements of a packet having sequence number n.

In an environment in which a connection can have multiple subflows, if any of the subflows were to experience congestion or to break, then subflow-level acknowledgements sent by the receiver device on the particular subflow may not be received by the sender device. Thus, if the sender device is unable to receive duplicate acknowledgements regarding a packet that may potentially be lost, then the sender device will not be able to implement a fast recovery mechanism in which the congestion window size is divided in half (or reduced by some other smaller amount) as compared to reducing the congestion window size to one (when a timeout occurs). Effectively, the inability of the sender device to receive subflow-level duplicate acknowledgements means that the sender device would not be able to trigger the fast recovery congestion window size setting technique that is responsive to receiving k duplicate acknowledgements.

In accordance with some embodiments, to address the foregoing issues, for setting the congestion window size, the sender device uses the acknowledgement information received over a different subflow than the subflow over which subflow-level acknowledgements may have been lost. In a specific example, the receiver device may have sent subflow-level duplicate acknowledgements to the sender device along subflow 1. However, subflow 1 may be experiencing congestion, in which case the subflow-level duplicate acknowledgements may not reach the sender device, which may mean that the sender device will not be able to detect k duplicate acknowledgements along subflow 1.

In accordance with some embodiments, the sender device uses data-level acknowledgement information sent along subflow 2 (different from subflow 1) to determine whether the receiver device has received k packets having sequence numbers following a particular packet sent by the sender device to the receiver device along subflow 1. In some embodiments, the data-level acknowledgement information in the different subflow (subflow 2) contains sufficient information to allow the sender device to make such determination. In some embodiments, mapping information may be maintained at the sender device to map connection-level sequence numbers to subflow-level sequence numbers. In some embodiments, a connection-level acknowledgement information (in a DACK) is mapped by the sender device to subflow-level sequence numbers that the sender device uses to determine from the connection-level acknowledgement information whether the receiver device has received k packets following a particular packet. Upon receiving the connection-level acknowledgement information from the receiver device, the sender device determines whether the receiver device has received k packets following a particular packet by mapping a connection-level acknowledgement information (in a DACK) to subflow-level sequence numbers.

If the sender device determines based on the acknowledgement information on this different subflow that k packets following a particular packet have been received by the receiver device on subflow 1, then the sender device triggers the fast recovery congestion window size setting mechanism, such as by reducing the congestion window size by half or by reducing the congestion window by any other factor that may, for example, be preconfigured in the device or that the device determines dynamically.

Two alternate congestion window size setting techniques according to some embodiments are discussed below. These congestion window size setting techniques can be used in connection with the Retransmission Solution 2 discussed above, but the techniques can also be applied in other scenarios.

With the first congestion window size setting technique, the sender device determines that the receiver device has received at least k (e.g., k=3) packets with SSN greater than n (where k is a parameter that can be for example preconfigured at the sender device). As noted above, this determination is made using data-level acknowledgement information received on a subflow different from a subflow over which subflow-level acknowledgements may have been lost. This can help to avoid retransmission timeout. The sender device reduces the congestion window size by an amount smaller than typically performed for TCP timeout, such as by using the Reno or NewReno techniques (or some other technique).

In alternative embodiments, a second congestion window setting technique involves determining a ratio of two parameters, N and M. The parameter N is a number of packets with SSN greater than n received by the receiver device, as indicated from a data-level acknowledgement (ACK or SACK). The parameter M is the total number of packets with SSN greater than n the sender device has sent. If the ratio N/M is greater than a predefined threshold T when a retransmission timeout timer of packet n (the lost packet) expires, the sender device reduces the congestion window size as if duplicate subflow-level ACKs were received (e.g., reducing the congestion window by half) rather than reducing the congestion window size to a low value such as 1. If the ratio N/M is smaller than the predetermined threshold T when the retransmission timeout timer of packet n expires, the sender device initializes the congestion window size as conventionally performed by TCP when the timer expires (e.g., the congestion window size is et to 1).

In different implementations, instead of taking the ratio of N to M (N/M), some other comparison of N and M is performed, such as by taking a difference between N and M.

Figure 9:
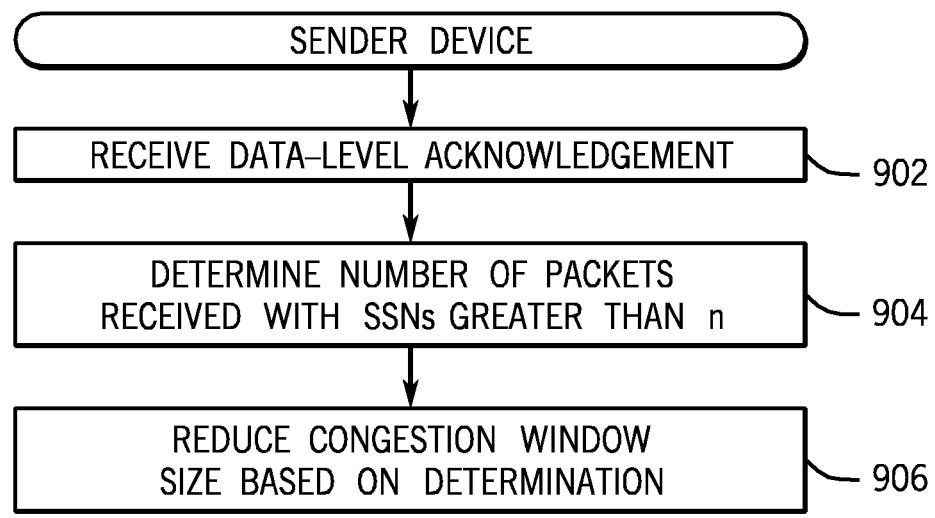
FIG. 9 is a flow diagram of a congestion window size setting process, according to some embodiments.

FIG. 9 is a flow diagram of a congestion size setting technique according to some embodiments. The process of FIG. 9 can use either the first or second congestion window size setting technique discussed above.

The sender device receives (at 902) data-level acknowledgement information in a subflow different from a subflow over which duplicate subflow-level acknowledgements may have been lost. Based on the data-level acknowledgement information, the sender device determines (at 904) a number of packets received with SSNs greater than n, where n is the SSN of the packet that has not yet been acknowledged.

Based on such determined number of packets with SSN greater than n received by the receiver device, the sender device reduces (at 906) the congestion window size. The reduction of the congestion window size can be according to either first or second congestion window size setting technique discussed above, according to some implementations.

If the data-level acknowledgement information indicates that k packets with SSNs greater than n have been received by the receiver device, then the sender device reduces the congestion window size by an amount less than a reduction that would occur for a TCP timeout.

Receiver Feedback Mechanisms or Techniques

In some implementations, retransmission solutions 1 and 2 discussed above depend on the sender device being able to determine with high confidence that the receiver device received packets with SSN greater than n, where n is the SSN of the lost or held packet. Some intermediate devices can modify or overwrite a subflow-level acknowledgement sent by the receiver device to the sender device, or generate (originate) a subflow-level ACK autonomously (even if the receiver device never sent one). For reliable operations, the sender device should know whether a subflow-level acknowledgement was sent by the receiver device or not. Various approaches are possible to allow the sender device to confirm that the source of a subflow-level acknowledgment (or other subflow-level feedback messaging) is the receiver device, rather than an intermediate device in a path between the sender device and the receiver device over which the feedback messaging was communicated. A "subflow-level feedback messaging" refers to messaging sent by a receiver device over a subflow in response to messaging received by the receiver device from a sender device. Some approaches are described below.

In a first approach (Approach 1), the sender device determines that a subflow-level ACK was sent by the receiver device by verifying that the subflow-level ACK is received together with an MPTCP-specific option. An "MPTCP-specific option" refers to a field or value that is used by MPTCP, but not by regular TCP. As an example, the MPTCP-specific option can be a data-level acknowledgement (ACK or SACK), which is used by MPTCP, but not by regular TCP. More generally, the MPTCP-specific option contains MPTCP-specific signaling (in the form of a field or value) for implementing MPTCP functionality. The sender device relies on the presence of an MPTCP-specific option (such as data-level acknowledgement) to determine that the subflow-level ACK (or subflow-level SACK) came from the receiver device (in other words, the subflow-level acknowledgement was not altered or overwritten by or originated from an intermediate device). This approach works only if a "transparent middlebox" assumption is true. A transparent middlebox is an intermediate device that does not allow an MPTCP-specific option (generated by the receiver device) through if the intermediate device altered the subflow-level ACK (or subflow-level SACK), or if the intermediate device generated a new subflow-level ACK (or subflow-level SACK) that overrides the one from the receiver device.

A second approach (Approach 2) applies in cases where it is not desirable or possible for the receiver device to send MPTCP-specific signaling in an MPTCP-specific option. For example, a message from the receiver device may not have enough space in the options section of the message for the MPTCP-specific option. Alternatively, there may not be any MPTCP-specific signaling to send by the receiver device. For such cases, a new MPTCP-specific Receiver Originated Flag option is produced, where this MPTCP-specific Receiver Originated Flag option is composed of a relatively small amount of information, such as 3 bytes. In some embodiments, the Receiver Originated Flag is encoded as a TCP option with 3 fields: KIND (1 byte), LENGTH (1 byte), and flag (1 byte).

In alternative implementations, the sender device includes a new specific attribute and treats the "flag" field as zero length signal by setting KIND="flag" and not conveying the LENGTH and VALUE fields thus conveying the flag in one byte. The Receiver Originated Flag can be considered a No-operation (NOP) MPTCP-specific option—this NOP MPTCP-specific option is different from the MPTCP-specific option of Approach 1 that contains MPTCP-specific signaling to implement MPTCP functionality. Like the Approach 1, Approach 2 works only if the transparent middlebox assumption is true.

A third approach (Approach 3), unlike Approaches 1 and 2, does not make any assumption about the middlebox behavior. In Approach 3, receiver device generates a subflow-level ACK (or subflow-level SACK) and calculates a receiver checksum of the subflow-level ACK (or subflow-level SACK) and sends the receiver checksum to the sender device. A checksum refers to a value that is calculated by applying a predefined function (such as a hash function) on content of a message to be communicated. In Approach 3, the checksum is calculated based on the content of the subflow-level acknowledgement (ACK or SACK) sent by the receiver device.

Upon receiving a subflow-level ACK (or subflow-level SACK) (along with the receiver checksum), the sender device calculates a checksum of the subflow-level ACK (or subflow-level SACK) and compares the sender-calculated checksum with the receiver checksum. The sender device determines that the subflow-level ACK (or subflow-level SACK) originated from the receiver device if the checksums match. This approach works for both transparent and non-transparent middleboxes.

In some implementations, the receiver checksum is sent as a standalone option and the receiver checksum is encoded as: KIND (1 byte), LENGTH (1 byte), and checksum (cksum bytes). The parameter cksum can be as small as 1, which means that the checksum field is one byte long. In such examples, the receiver checksum is made up of 3 bytes. In other examples, the parameter cksum can be greater than one, in which case the receiver checksum will be longer than 3 bytes. This approach of using a standalone receiver checksum option is referred to as "Approach-3-Basic."

In other implementations, the receiver checksum is sent along with other options in a message (e.g., if the receiver device has to send other options) by appending the checksum bytes (without the associated KIND and LENGTH fields described above) to the other options being sent. DACK is an example of an option that can be sent by the receiver device. DACK is normally encoded with the following fields: KIND="DACK" (1 byte), LENGTH (1 byte), and the DACK content (K byes). If the checksum is appended to DACK, the result is encoded as KIND="DACK with checksum appended" (1 byte), LENGTH (1 byte), DACK content (K bytes) and checksum (cksum bytes). This approach of appending the receiver checksum to other options is referred to as "Approach-3-Opt."

The use of any of the three approaches (Approach 1, 2, or 3) discussed above can use up space in the TCP options contained in TCP packets by employing additional bytes, and thus the three approaches should be used only when appropriate. Each of the MPTCP-specific option of Approach 1, MPTCP-specific Receiver Originated Flag option of Approach 2, and checksum of Approach 3 can be considered generally as "predefined information" useable by a sender device to confirm whether the source of feedback messaging is the receiver device. Note that the predefined information is unable to be changed or generated by an intermediate device in a path between the sender device and the receiver device over which the feedback messaging is communicated, even though the intermediate device may be capable of modifying another portion of the feedback messaging carrying the predefined information, or originating feedback messaging. For example, the MPTCP-specific information according to Approach 1 or 2 or the checksum according to Approach 3 is not changeable by an intermediate device.

Figure 10:
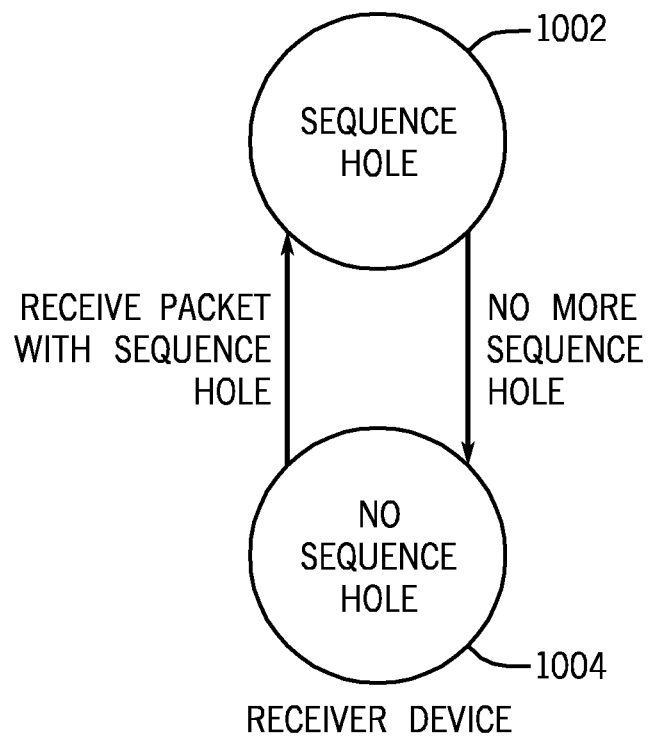

As depicted in FIG. 10, a receiver device can transition between a "sequence hole" state 1002, and a "no sequence hole" state 1004. Assuming the receiver device is in the "no sequence hole" state 1004, the receiver device transitions to the "sequence hole" state 1002 upon detecting an event indicating that the receiver device has detected a sequence hole (e.g., the receiver device detects a sequence number hole in the SSN numbering) in messaging received from the sender device. The receiver device remains in the "sequence hole" state 1002 for as long as the sequence hole condition is present. The event indicating that the receiver device has detected a sequence hole is one example of a trigger event. More generally, a trigger event that cause the receiver device to transition to the "sequence hole" state 1002 includes an event indicating a need for the sender device to receive subflow-level feedback information from the receiver device.

Upon receiving an event indicating that the packets previously missing (that caused the sequence number hole) have been received, such as along the same subflow, the receiver device transitions to the "no sequence hole" state 1004, where the receiver device remains until the receiver device detects another sequence hole.

The receiver device uses one of the three approaches (Approaches 1-3) above for providing feedback to the sender device so long as the receiver device is in the "sequence hole" state 1002. When the receiver device is in the "no sequence hole" state, the receiver device does not use any of the Approaches 1-3 for feedback (in other words, the receiver device does not include the predefined information of any of Approaches 1-3 in feedback messaging), unless it has other reasons to send an MPTCP-specific option (e.g., a data-level acknowledgement).

The receiver device can also have various modes of operation, including mode A and mode B, in some examples. The receiver devices behaves according to mode A when the receiver device cannot determine if the transparent middlebox assumption is true. In mode A, the receiver device uses Approach 3 (either Approach-3-Basic or Approach-3-Opt) discussed above). On the other hand, the receiver device behaves according to mode B if the receiver device determines that the transparent middlebox assumption is true. In mode B, the receiver device is able to use Approach 1 or Approach 2 discussed above.

Figure 11:
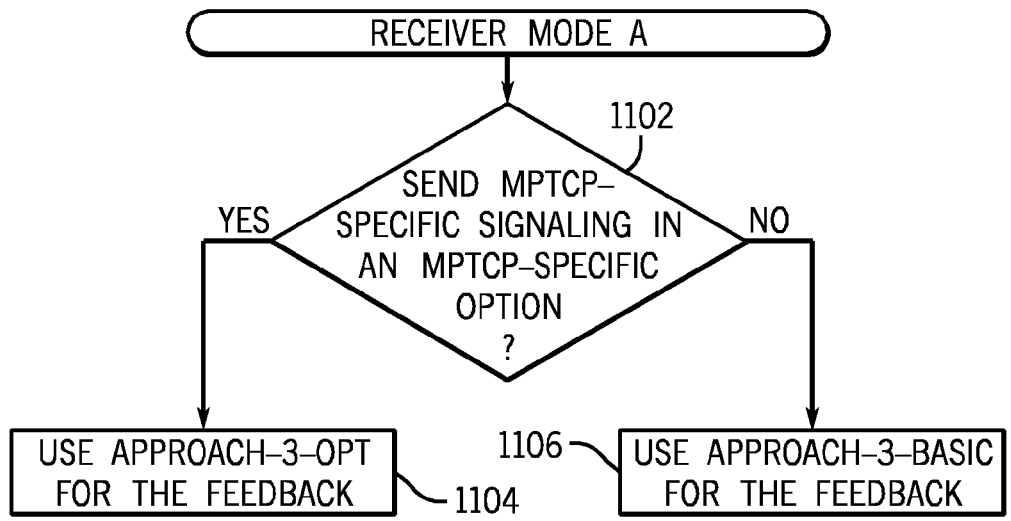
FIGS. 11 and 12 are flow diagrams of processes of the receiver device, according to some embodiments.

FIG. 11 illustrates the mode A operation of the receiver device. The receiver device determines (at 1102) if the receiver device has to send MPTCP-specific signaling in an MPTCP-specific option. If so, then the receiver device uses Approach-3-Opt for the checksum feedback (at 1104). As noted above, Approach-3-Opt refers to the approach in which a receiver checksum is appended to an MPTCP-specific option.

On the other hand, if the receiver device determines (at 1102) that the receiver device does not have to send MPTCP-specific signaling in an MPTCP-specific option, then the receiver device uses Approach-3-Basic for the checksum feedback (at 1106), where in this approach the receiver checksum is sent as a standalone option.

Figure 12:
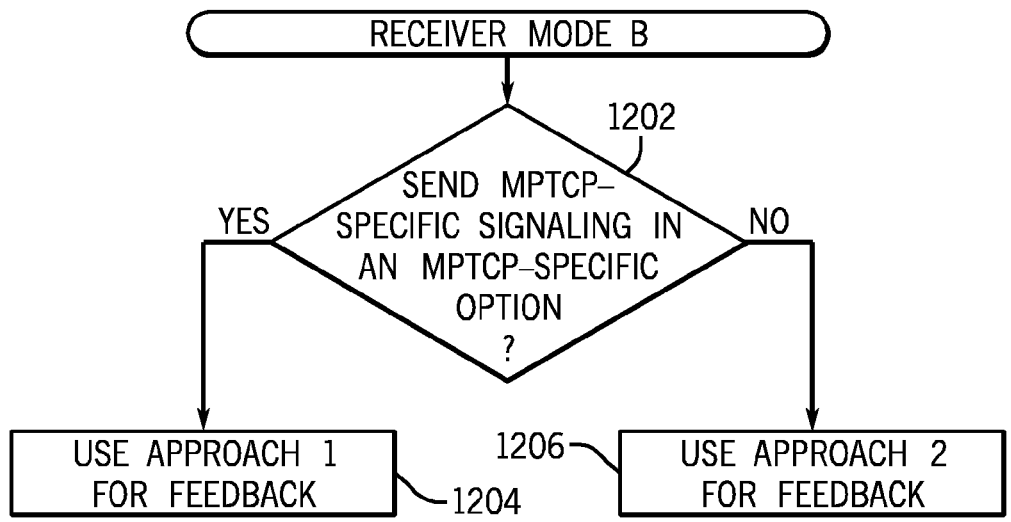

FIG. 12 depicts an operation of the receiver device in mode B. The receiver device determines (at 1202) whether the receiver device has to send MPTCP-specific signaling in an MPTCP-specific option. If so, then Approach 1 is used (at 1204) for providing feedback to the sender device. As discussed above, Approach 1 refers to sending an MPTCP-specific option to alert the sender device that the message is from the receiver device (rather than from an intermediate device).

If the receiver device does not have to send MPTCP-specific signaling in an MPTCP-specific option, then the receiver device uses (at 1206) Approach 2 for feedback, where Approach 2 refers to use of the Receiver Originator Flag discussed above.

In alternative implementations, the above 3 approaches (Approaches 1, 2, and 3) can be combined, such as follows. The receiver device can transition between mode A and mode B according to the state diagram in FIG. 13. Typically, the receiver device starts initially in mode A (in which the receiver device uses checksum feedback).

Various events can be received by the receiver device to cause the receiver device to switch between modes A and B. A first event is an event indicating that it is safe to switch to mode B. The receiver device determines that the "transparent middlebox" assumption is true and therefore that it is safe to switch to mode B. The determination can be based on: (1) a priori knowledge of the system configuration, or (2) a specific "checksum-match" signaling from the sender device (details on such signaling are provided further below), or (3) some other mechanism.

A second event is a subflow change event. This is typically due to mobility when a network device changes its IP address or other parameter due to movement of the network device between different access networks. In response to the second event, the receiver device cannot determine that the "transparent middlebox" assumption is still true on the new subflow and therefore has to transition to mode A.

As shown in FIG. 13, in response to detecting the first event (safe to switch to mode B), the receiver device sends a "Switch-to-B" notification. The receiver device sends the "Switch-to-B" notification to the sender device when the receiver device determines that it is safe to switch to mode B to inform the sender device that the receiver device has switched to mode B. Upon receiving the Switch-to-B notification, the sender device processes the feedback from the receiver device according to mode B.

In some embodiments, the Switch-to-B notification is carried in an explicit signaling (e.g., by using a new option). In other implementations, the MPTCP-specific option (Approach 2 above) can be used as the "Switch-to-B" notification. In further implementations, the receiver device provides a "Switch-to-B" notification implicitly by stopping to use Approach 3 (checksum feedback), i.e., by not including any more checksums as described in Approach 3.

As depicted in FIG. 13, in response to detecting the second event (subflow change event), the receiver device sends a "Switch-to-A" notification. The receiver device sends the "Switch-to-A" notification to the sender device to inform the sender device that the receiver device has switched to mode A. Upon receiving the "Switch-to-A" notification, the sender device processes the feedback from the receiver device according to mode A. In some implementations, the "Switch-to-A notification" is carried in explicit signaling (e.g., by using a new option). In other implementations, the receiver device sends the "Switch-to-A notification" implicitly by resuming the use of Approach 3 (i.e., the receiver device resumes sending the checksums of Approach 3).

The sender device also operates according to mode A or B, and transitions between these modes according to FIG. 14. The sender device starts initially in mode A. Two events can be received by the sender device.

A first event is reception of a "Switch-to-A" notification, as discussed above, which can be explicit or implicit. A second event is reception of a "Switch-to-B" notification, as described above, which can be explicit or implicit. As shown in FIG. 14, in response to receiving a "Switch-to-A" notification, the sender device switches to mode A operation. In response to receiving a "Switch-to-B" notification, the sender device transitions to mode B.

Effectively, the sender and receiver devices communicate different types of the "predefined information" (according to Approach 1, 2, or 3) in feedback messaging (from the receiver device to the sender device) depending on which mode (mode A or mode B) the sender and receiver devices are in.

Figure 15:
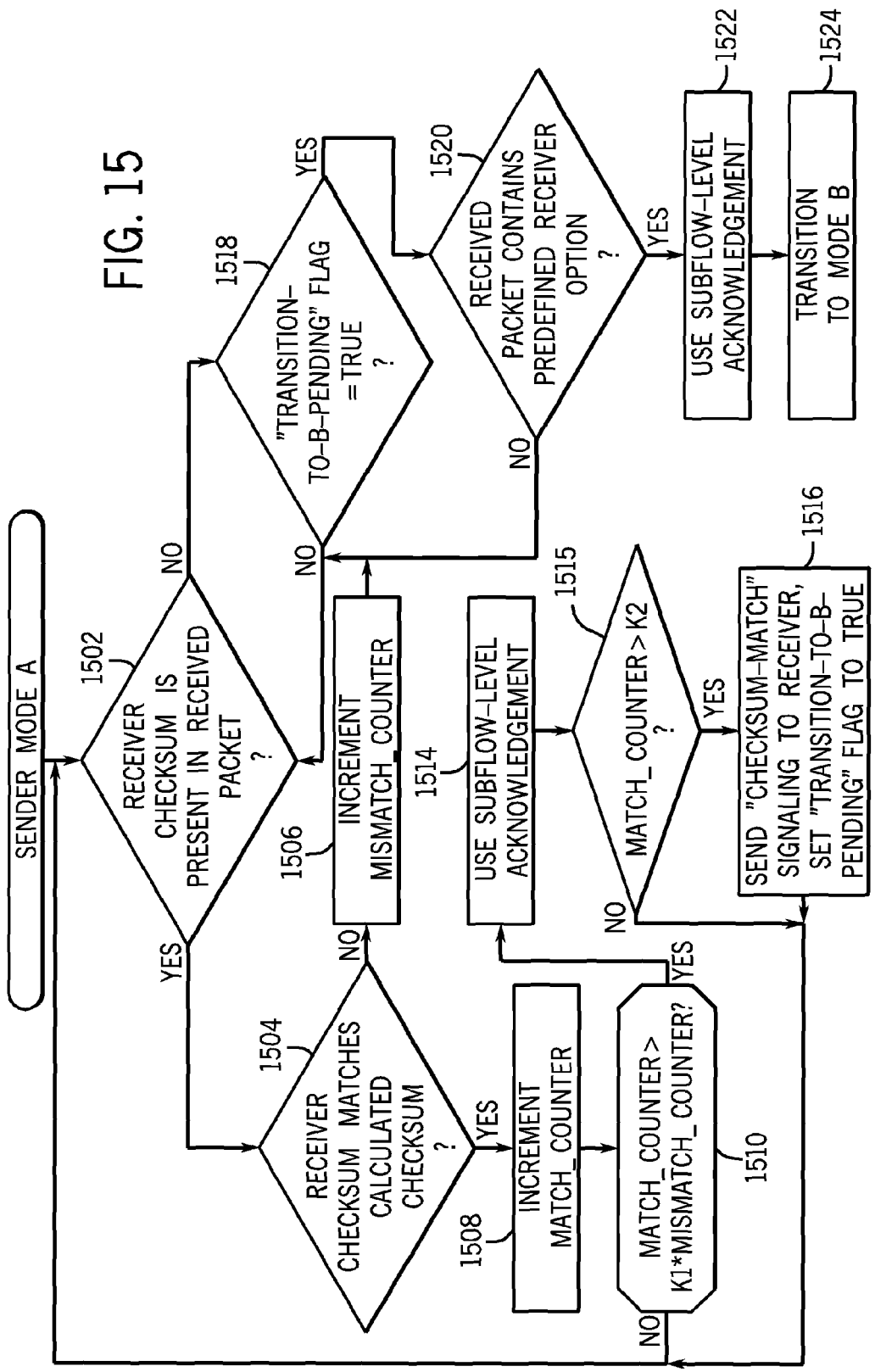
FIGS. 15-16 are flow diagrams of processes of the sender device according to some embodiments.

FIG. 15 shows mode A operation of the sender device. In mode A, the sender device expects to receive feedback from the receiver device according to mode A—in other words, the sender device expects to receive the receiver checksum of Approach 3 discussed above. However, when a transition to mode B is pending, the sender may receive feedback according to mode B—that is, there is no receiver checksum.

When entering mode A, the sender device initializes a Mismatch_Counter and Match_Counter to zero, and sets a "Transition-to-B-pending" flag to false.

As depicted in FIG. 15, the sender device determines (at 1502) whether a receiver checksum is present in a received packet. If so, the sender device determines (at 1504) if the receiver checksum matches the sender-calculated checksum. If not, the sender device increments (at 1506) the Mismatch_Counter. On the other hand, if the receiver checksum matches the sender-calculated checksum, the sender device increments (at 1508) the Match_Counter.

In tasks 1508 and 1506, the sender device effectively counts the instances of checksum matches and mismatches, respectively. In some examples, when the count of matches exceeds a value of K1 times the count of mismatches (as determined at 1510), the sender device is able to use (at 1514) a subflow-level acknowledgment from the receiver device, since the sender device has determined with high confidence (due to MATCH_COUNTER>K1*MISMATCH_COUNTER) that the "transparent middlebox" assumption is true. If the determination at 1510 is not true, then the sender device does not use the subflow-level acknowledgement from the receiver device. The sender device next determines (at 1515) if MATCH_COUNTER is greater than K2. Note that K1 and K2 are parameters that can be preconfigured, for example. If the determination at 1515 is true, the sender device sends (at 1516) a "checksum-match" signaling to the receiver device (to notify the receiver device that the "transparent middlebox" assumption is true), and sets the "Transition-to-B-pending" flag to true. When the "Transition-to-B-pending" flag is true, the sender device is confident that the "transparent middlebox" assumption is true and therefore does not have to use a receiver checksum to validate that feedback is from the receiver device (in other words, Approach 1 or 2 is sufficient).

If the sender device determines (at 1502) that a receiver checksum is not present in a received message, then the receiver device determines (at 1518) whether the "Transition-to-B-Pending" flag is true. If so, the sender device determines (at 1520) if the receiver packet contains a predefined receiver option (either the MPTCP specific option of Approach 1 or the Receiver Originator Flag of Approach 2). If not, then the process returns (to 1502). However, if the determination at 1520 is true, then the sender device uses (at 1522) the subflow-level acknowledgment from the receiver device, and the sender device switches (at 1524) to mode B. Note that the switch performed at 1524 is in response to an implicit "Switch-to-B" notification, when the receiver device simply stops sending receiver checksums. If the "Switch-to-B" notification is explicit, the sender device switches to mode B when the sender device sees the corresponding explicit signaling.

Figure 16:
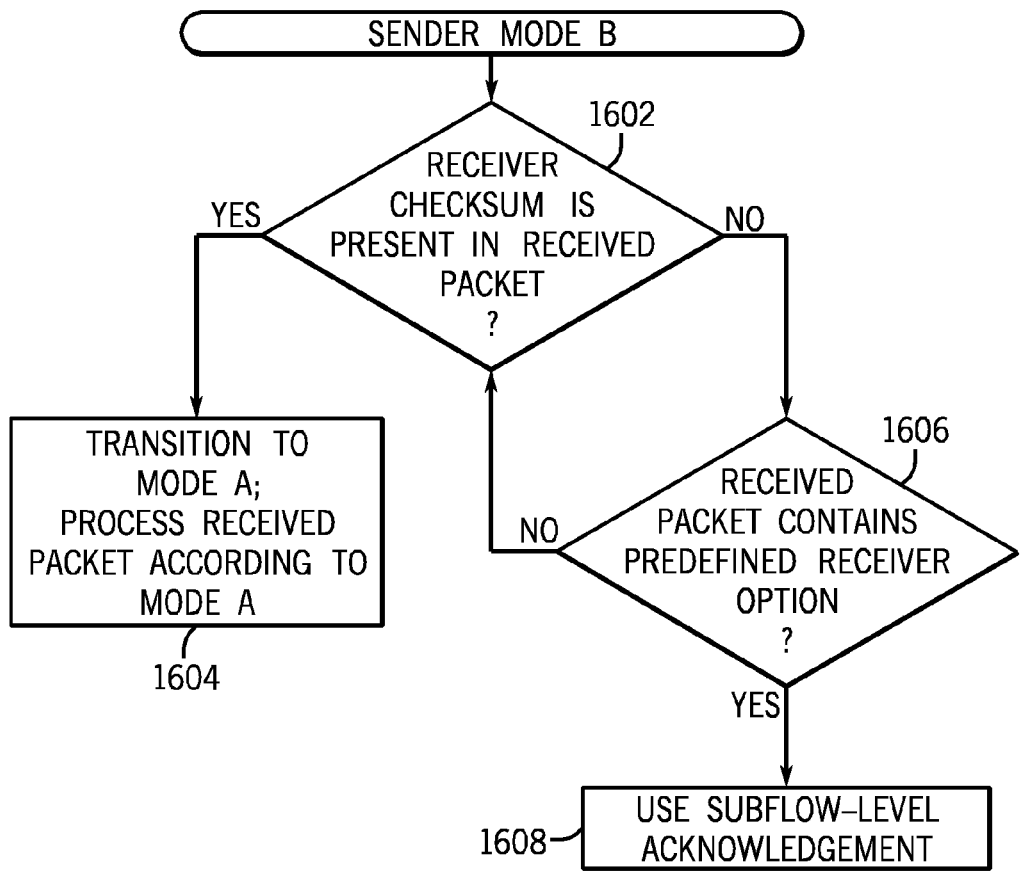

FIG. 16 shows mode B operation of the sender device. As depicted in FIG. 16, the sender device determines (at 1602) if a receiver checksum is present in a received packet. If so, then that is an implicit "Switch-to-A" notification, in which case the sender device transitions (at 1604) to mode A. In mode A, the sender device expects to receive receiver checksums in messages to confirm that the messages originate from the receiver device (rather than from an intermediate device).

If the determination at 1602 indicates that there is no receiver checksum in a received message, then the sender device determines (at 1606) whether the received message contains a predefined receiver option (either an MPTCP-specific option or a Receiver Originated Flag). If not, the process returns. However, if the determination at 1606 is true, then the sender device uses (at 1608) the subflow-level acknowledgment from the receiver device. If the determination at 1606 is not true, then the sender device does not use the subflow-level acknowledgement from the receiver device.

Figure 17:
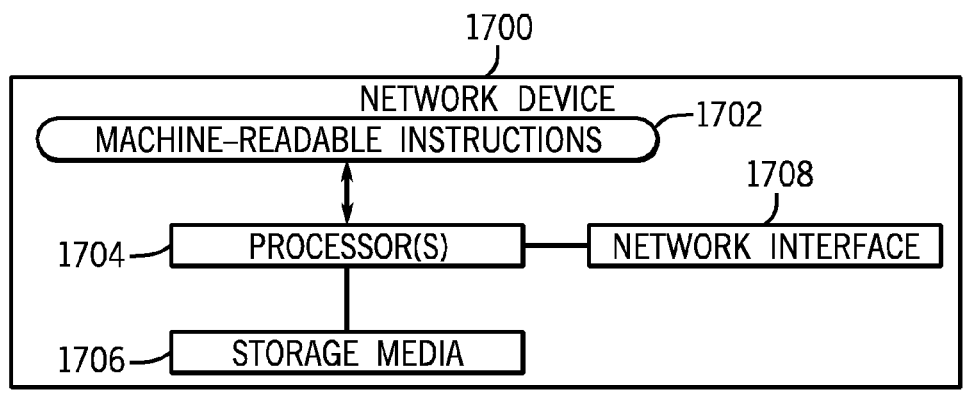
FIG. 17 is a block diagram of a network device according to some embodiments.

FIG. 17 is a block diagram of a network device 1700, which can be network device 104 or 106 in FIG. 1, for example. The network device 1700 includes machine-readable instructions 1702 executable on one or multiple processors 1704. The processor(s) 1704 is (are) connected to storage media 1706. The network device also includes a network interface 1708 to allow the network device 1700 to communicate over a data network, such as network 102 in FIG. 1.

A protocol stack, such as protocol stack 112 or 114 depicted in FIG. 1, can be implemented in the network interface 1708 or as part of the machine-readable instructions 1702, or both. The machine-readable instructions 1702 or the network interface 1708, or some combination thereof, can perform the various tasks discussed above.

The machine-readable instructions 1702 are loaded for execution on the processor(s). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media (e.g., 1706). The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
sending, by a user device, packets over a plurality of subflows over a network destined to a receiver device;
receiving, by the user device, response information that is responsive to the packets, wherein the response information includes a subflow-level sequence number (SSN) of at least one of the packets, the SSN indicating a sequence number in one of the plurality of subflows over which the at least one of the packets is transmitted;
determining, based on the SSN in the response information, that the response information indicates at least one of a first condition or a second condition, wherein the first condition includes that the network between the user device and the receiving device is without a blocking intermediate device or at least one packet was lost after transmission from an intermediate device in the network between the user device and the receiver device, and the second condition includes the response information indicating that the blocking intermediate device is present between the user device and the receiver device, or a subset of the packets sent by the user device was lost before reaching the blocking intermediate device;
controlling a behavior of the user device based on the response information, wherein controlling the behavior comprises:
when the response information is determined to indicate the first condition, causing the user device to implement a first behavior with respect to data transmission over the plural of subflows, wherein the first behavior includes retransmitting a lost packet over one of the plural of subflows via a first network that is different from a second network of another one of the plural of subflows over which the lost packet was originally sent; and
when the response information is determined to indicate the second condition, causing the user device to implement a second, different behavior with respect to data transmission over the plural of subflows,
wherein the second behavior includes retransmitting the lost packet over the one of the plural of subflows over which the lost packet was originally sent; and
wherein the blocking intermediate device is a device in the network that prevents at least a subset of the packets from the user device from reaching the receiver device if the packets exhibit a predefined characteristic, the predefined characteristic is a sequence number hole in the packets sent by the user device, and the sequence number hole is caused by refraining from sending a particular packet having a particular sequence number.

2. The method of claim 1, further comprising determining that the blocking intermediate device is not present based on the response information indicating that the receiver device has received packets having sequence numbers greater than the particular sequence number.

3. The method of claim 1, further comprising:
starting a timer upon sending a packet having a sequence number that is at least one larger than the particular sequence number.

4. The method of claim 3, further comprising:
determining whether an indication has been received from the receiver device indicating that the receiver device has received a packet having a sequence number greater than the particular sequence number; and
in response to expiration of the timer before the user device receiving the indication, releasing the particular packet to send to the receiver device.

5. The method of claim 4, wherein the timer is associated with a timeout value, the method further comprising:
setting the timeout value to satisfy all of the following conditions:
the timeout value is at least larger than a round trip time of data between the user device and the receiver device,
the timeout value is less than a value specified by an application in the user device, and
the timeout value is less than a difference between a remaining time in a timeout timer of unacknowledged data and a round trip time of data between the user device and the receiver device, where the remaining time is measured from a start of the timer.

6. The method of claim 4, further comprising:
determining a number of attempts performed by the user device in attempting to determine whether the blocking intermediate device is present; and
in response to detecting that the number of attempts is greater than a predefined threshold, causing the user device to operate according to the second behavior.

7. The method of claim 1, further comprising:
splitting a particular packet into plural segments; and
causing the sequence number hole by refraining from sending a particular one of the segments having a particular sequence number.

8. The method of claim 1, wherein the user device implementing the first behavior comprises the user device retransmitting the lost packet on a selected one of the plural of subflows that exhibits least congestion.

9. The method of claim 1, wherein the user device implementing the first behavior further comprises the user device maintaining a held packet in a send buffer of the user device according to a first technique, and
wherein the user device implementing the second behavior comprises the user device maintaining the held packet in the send buffer of the user device according to a second, different technique.

10. The method of claim 9, wherein the user device maintaining the held packet in the send buffer according to the first technique comprises the user device sending the held packet to the receiver device in response to the user device receiving an acknowledgement at the connection level that the packets have been received by the receiver device.

11. The method of claim 10, wherein the user device maintaining the held packet in the send buffer according to the second technique comprises the user device maintaining the held packet in the send buffer at the connection level as long as the packets has not been acknowledged at the connection level as well as in all subflows that the packets have been sent on.

12. The method of claim 1, wherein the plural of subflows are subflows between the user device and the receiver device according to a Multipath Transmission Control Protocol (MPTCP).

13. A user device comprising:
a network interface to communicate with a second network device over a network; and
at least one processor to:
send packets over a plurality of subflows over the network destined to the second network device;
receive response information that is responsive to the packets, wherein the response information includes a subflow-level sequence number (SSN) of at least one of the packets, the SSN indicating a sequence number in one of the plurality of subflows over which the at least one of the packets is transmitted;
determine, based on the SSN in the response information, that the response information indicates at least one of a first condition or a second condition, wherein the first condition includes that the network between the user device and the receiving device is without a blocking intermediate device or at least one packet was lost after transmission from an intermediate device in the network between the user device and the receiver device, and the second condition includes the response information indicating that the blocking intermediate device is present between the user device and the receiver device, or a subset of the packets sent by the user device was lost before reaching the blocking intermediate device;
control a behavior of the user device based on the response information, wherein controlling the behavior comprises:
when the response information is determined to indicate the first condition, causing the user device to implement a first behavior with respect to data transmission over the plural of subflows, wherein the first behavior includes retransmitting a lost packet over one of the plural of subflows via a first network that is different from a second network of another one of the plural of subflows over which the lost packet was originally sent; and
when the response information is determined to indicate the second condition, causing the user device to implement a second, different behavior with respect to data transmission over the plural of subflows, wherein the second behavior includes retransmitting the lost packet over the one of the plural of subflows over which the lost packet was originally sent; and
wherein the blocking intermediate device is a device in the network that prevents at least a subset of the packets from the user device from reaching the receiver device if the packets exhibit a predefined characteristic, the predefined characteristic is a sequence number hole in the packets sent by the user device, and the sequence number hole is caused by refraining from sending a particular packet having a particular sequence number.

14. The user device of claim 13, wherein the network interface includes a layer according to a Multipath Transmission Control Protocol (MPTCP).

15. The method of claim 1, wherein the first network is of a first network type, and the second network is of a second network type different from the first network type.

16. The method of claim 15, wherein the first network type is a mobile communications network, and the second network type is a wireless local area network.

17. The user device of claim 13, wherein the first network is of a first network type, and the second network is of a second network type different from the first network type.

18. The user device of claim 17, wherein the first network type is a mobile communications network, and the second network type is a wireless local area network.

* * * * *